(12) United States Patent
Petluru et al.

(10) Patent No.: US 10,922,544 B2
(45) Date of Patent: Feb. 16, 2021

(54) SYSTEM AND INTERACTIVE METHODS ENABLING COMMUNICATION AND COLLABORATION IN BLENDED ECOSYSTEMS

(71) Applicant: Conduent Business Services, LLC, Florham Park, NJ (US)

(72) Inventors: Snigdha Petluru, Bengaluru (IN); Sitara Shah, Bengaluru (IN); Archana Ramakrishnan, Bengaluru (IN)

(73) Assignee: Conduent Business Services, LLC, Florham Park, NJ (US)

( * ) Notice: Subject to any disclaimer, the term of this patent is extended or adjusted under 35 U.S.C. 154(b) by 59 days.

(21) Appl. No.: 16/278,116

(22) Filed: Feb. 17, 2019

(65) Prior Publication Data

US 2020/0265228 A1    Aug. 20, 2020

(51) Int. Cl.
| | |
|---|---|
| *G06K 9/00* | (2006.01) |
| *H04L 12/58* | (2006.01) |
| *G06K 9/32* | (2006.01) |
| *G06F 9/54* | (2006.01) |
| *G06F 40/169* | (2020.01) |

(52) U.S. Cl.
CPC ......... *G06K 9/00671* (2013.01); *G06F 9/542* (2013.01); *G06F 40/169* (2020.01); *G06K 9/3233* (2013.01); *H04L 51/16* (2013.01); *H04L 51/24* (2013.01)

(58) Field of Classification Search
CPC ............. G06K 9/00671; G06K 9/3233; G06K 9/6263; G06F 40/169; G06F 9/542; G06F 3/1454; H04L 51/16; H04L 51/24; G02B 2027/0138; G02B 2027/014; G02B 2027/0178; G02B 27/017; G06T 19/006; G06T 11/00; G09B 19/003

See application file for complete search history.

(56) References Cited

U.S. PATENT DOCUMENTS

2016/0350595 A1* 12/2016 Solomin ............... G06K 9/6263
2020/0126445 A1* 4/2020 Tan ....................... G09B 19/003

* cited by examiner

*Primary Examiner* — Jianxun Yang
(74) *Attorney, Agent, or Firm* — Ortiz & Lopez, PLLC; Kermit D. Lopez; Luis M. Ortiz

(57) ABSTRACT

A blended communication engine helps bridge a gap amongst users in the blended ecosystem by allowing a multi-channel platform for shared, real-time interaction amongst the users, system, and environment. This engine can provide three different forms of interaction between the user and the ecosystem: Share and Alert—The ability to alert another user or group by sharing an information block; Instruct and Assign—The ability to highlight segments of interest within an information block and direct the corresponding instructions to specific people; Converse and Collaborate—The involved members' ability to have contextual discussions about shared information blocks and instructions. Users interact with each other in virtual reality and augmented reality platforms over communication links using annotations on real objects in an environment thereby enabling efficient information tagging of real-world objects, and communication between personnel managing the objects.

20 Claims, 21 Drawing Sheets

SYSTEM AND INTERACTIVE METHODS ENABLING COMMUNICATION AND COLLABORATION IN BLENDED ECOSYSTEMS

TECHNICAL FIELD

The embodiments are generally related to immersive technologies. More particularly, embodiments are related to technology that can bridge a gap between real and virtual worlds by enabling multi-directional communication and collaboration between users of systems and environments utilizing immersive technologies including mixed reality. Embodiments are further related to systems and methods enabling interactions in blended reality that can feature interactivity in categories including, share and alert, instruct and assign, and converse and collaborate.

BACKGROUND

Organizations are rapidly infusing emerging technologies into their production workflows to optimize how their businesses function. With higher computing power available on demand, and enhanced capabilities of portable hand-held and wearable devices, Mixed Reality has found its mark as not just a source of consumer commodities, but also as an integral element in industrial frameworks. Recent reports reflect the vitality of immersive interfaces and intelligent "things" in empowering strategic decision-making and harboring new ecosystems and business models for organizations to compete in the digital world. A greater challenge at hand however is the disjointing effect that these immersive technologies have on individuals and groups.

Information seeking practices have become highly personalized, and information is not often constant across groups. When immersive environments are introduced to the workplace, it can further complicate teamwork and collaboration. Adding to the complexity is the dynamism and flexibility offered to individuals with respect to location, timing, and reporting. So new age technologies have been focusing on enthralling individuals than for the collective. More pressing is the narrative of these technologies providing sheer entertainment as opposed to collaborative efforts for business, industry and professions. Experiences are isolated, and there is a lack of effective communication amongst other users, most of whom might ideally share experiences in an identical setting. The result of such selective platforming is that there is less emphasis on investigating how these technologies are integrated in real-time to support multi-party engagement, creating a wide rift between machine intelligence and end users.

Furthermore, a major drawback in interaction with physical objects is that creating contextual labeling of these objects is difficult because: a physical note need not preserve privacy of the system and can be accessible to everyone, not everyone can comprehend the context behind the note, and there could be multiple contexts at play, and if multiple users interact with the object, their equation with the object could be distinct or identical to that of other users.

Due to these reasons, physical labeling and context setting is harder to do. With that in mind, a completely virtual context is out of question, since visual markers can lead to better retention of memory and associations. Blended Communication can be used to create privacy-aware contextual settings and narratives that users can choose to share with others. While enabling multi-party communication is a common process in most systems and applications, rarely is this incorporated on the fly in the realm of mixed reality.

What are needed are interactive design methods to bridge the missing gap between the real and virtual worlds by enabling multi-directional communication and collaboration between users about a system and its environment. The embodiments described herein can enable such interactions in blended reality and feature interaction methods including share and alert, instruct and assign, and converse and collaborate.

BRIEF SUMMARY OF EMBODIMENTS

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus to support multi-party interactions in mixed reality platforms through the provision of collaboration and communication solutions.

It is another aspect of the embodiments to provide a method, system, and apparatus that enable the ability to assign tasks to users in a blended environment, support color-differentiated highlighting within information block, and tagging users in groups to highlighted block.

It is yet another aspect of the embodiments to provide a method, system and apparatus that support multi-threaded conversations and comments regarding shared information block.

According to another feature of the embodiments, a blended knowledge ecosystem, or in short, a blended ecosystem can be provided—an ecosystem that can utilize a blended reality engine to enable immersive interactions between the user, system, and the real environment. This ecosystem can facilitate contextualization of information being viewed as well as prioritization of follow-up actions that can be taken. It also provides seamless communication amongst users, enabling shareable insights and prompt decision-making from dynamically assimilated knowledge.

It is a feature of the embodiments to enable the mapping of physical objects to appropriate information. This can be attained only if the objects can be instantaneously recognized in the real world by the blended interface. Computer vision modules can help achieve this instantaneous recognition and mapping to a corresponding information retrieval pipeline. This can contain two distinct forms of recognition—recognizing an object in the real world, and recognizing components within the object to get granular information about the same.

It is another feature to provide a blended communication engine that can bridge a gap amongst users in the blended ecosystem by allowing a multi-channel communication platform for shared, real-time interaction amongst the users, system, and environment. This blended communication engine can provide three modules supporting different forms of interaction between users and the blended reality ecosystem: a Share and Alert module supports the ability for users to alert another user or group of users by sharing an information block; Instruct and Assign module—provides user the ability to highlight segments of interest within an information block and direct the corresponding instructions to specific people; Converse and Collaborate module—provides involved users that are members of a subject of interaction/discussion with the ability to have contextual discussions about shared information blocks and instructions.

It is another feature to provide multi-way communication, making users information producers as well. Users can not only receive information from the system and environment, but also have conversations about both real and blended objects in the system.

It is another feature to provide the incorporation of user feedback and provide real-time insights on the fly on a blended interface.

It is yet another feature to provide a blended communication engine that can include a share and alert module enabling a user to alert another user or group by sharing blended information blocks, a instruct and assign module enabling the user to highlight segments of interest within the information block and direct corresponding instructions to specific users, and a converse and collaborate module enabling select users engaged as members in collaboration with an ability to have contextual discussions about shared information blocks and instructions. The communication engine can bridge a gap amongst users in the blended ecosystem by allowing a multi-channel platform for shared, real-time interaction amongst the users, system, and environment.

It is yet another feature wherein a user of a blended communication engine can interact with a group of users by: scanning an object of interest, identifying the object of interest, and mapping the object of interest to a unique object identifier; rendering an information block related to the object for a user selection of at least one of the object health, the component health, and the pending tasks; tagging concerned user that should receive the sharable content from the information block; and sharing the sharable content with the concerned users.

The aforementioned aspects and other objectives and advantages can now be achieved as described herein. A system for the in-situ cleaning of transport belts can include a cleaning web disposed between a marker platen (or vacuum plenum) and a transport belt. The cleaning web can be configured to move opposite in direction to the transport belt over the marker platen. The cleaning web operation can be mechanically adjusted.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION OF THE EMBODIMENTS

Figure 1:
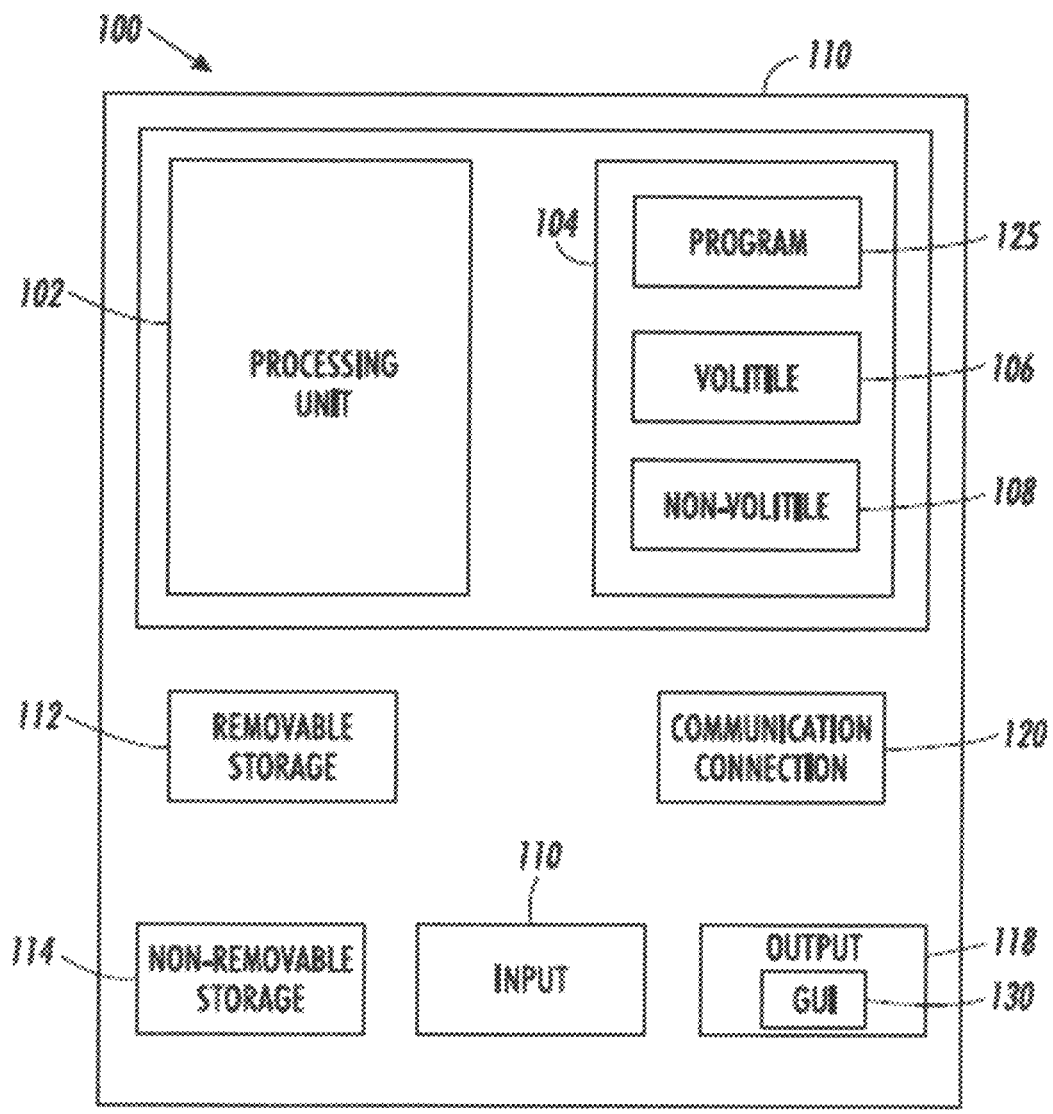
FIG. 1 depicts a block diagram of a computer system which can be implemented in accordance with the present embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
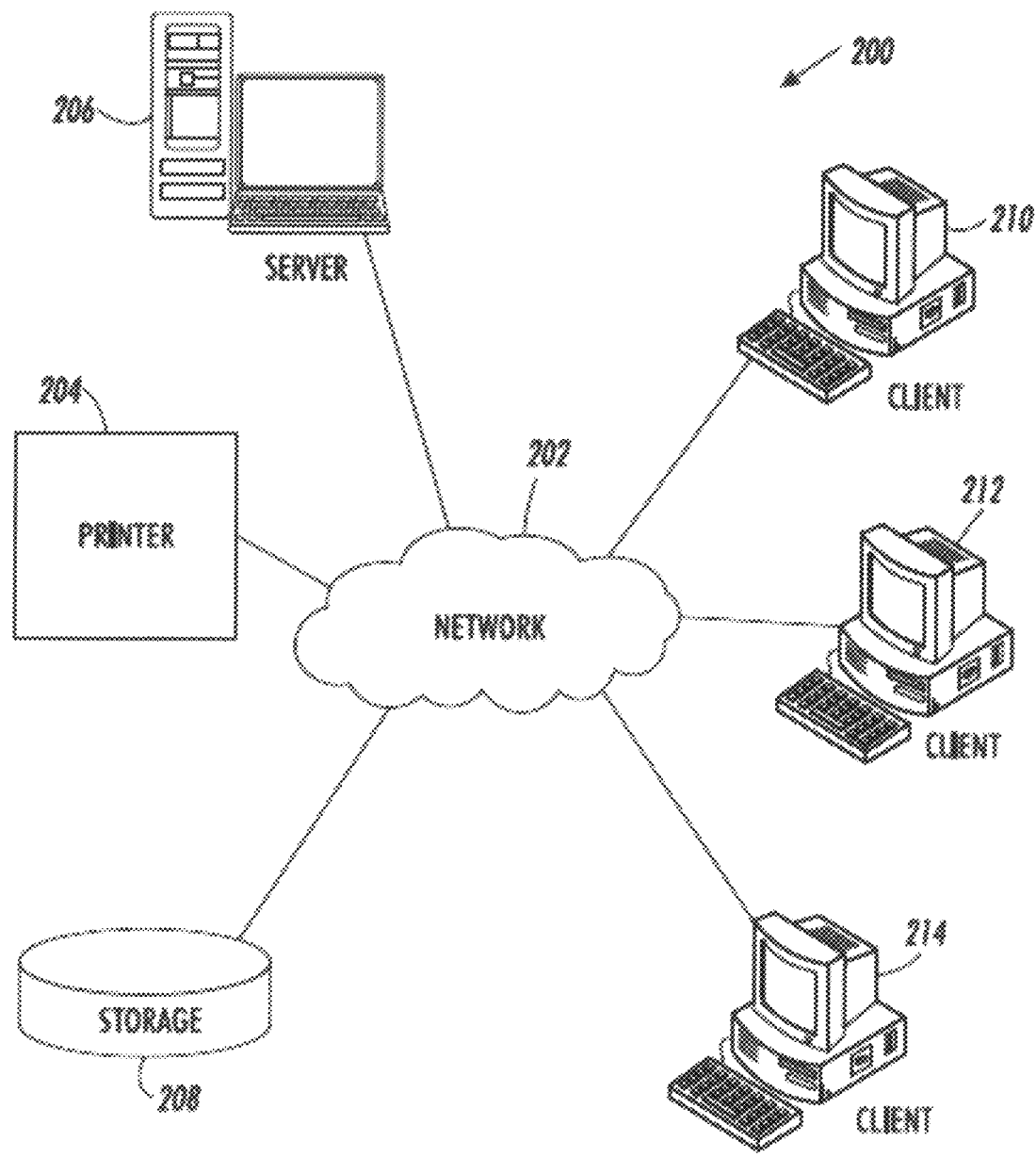
FIG. 2 depicts a graphical representation of a network of data-processing devices in which aspects of the present embodiments can be implemented.
Figure 3:
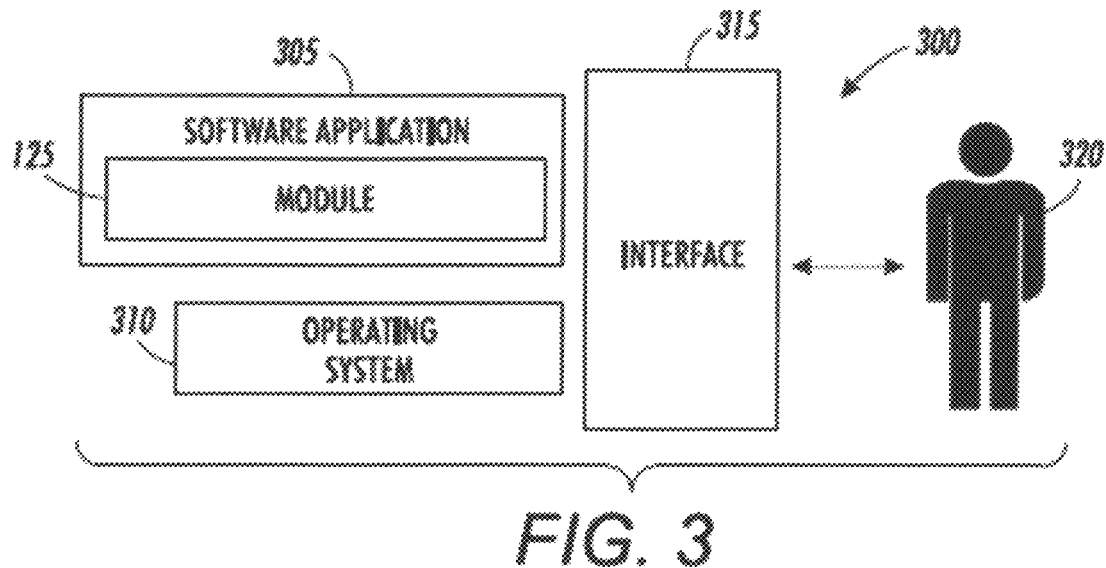
FIG. 3 depicts a computer software system for directing the operation of the data-processing system depicted in FIG. 1, in accordance with an example embodiment.

FIGS. 1-3 are provided as exemplary diagrams of data processing and networking environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that can execute programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 can include volatile memory 106 and non-volatile memory 108. Computer 110 can include or have access to a computing environment that includes a variety of transitory and non-transitory computer-readable media such as volatile memory 106 and non-volatile memory 108, removable storage 112 and non-removable storage 114. Computer storage as described herein can include, for example, disc storage, disk storage, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Discs (DVD) or other optical disc storage, magnetic cassettes, magnetic tape, magnetic disk storage, or other magnetic storage devices, or any other medium capable of storing computer-readable instructions as well as data including image data.

Computer 110 can include, or have access to, a computing environment that includes input 116, output 118, and a communication connection 120. The computer can operate in a networked environment using a communication connection 120 to connect to one or more remote computers, remote sensors and/or controllers, detection devices, hand-held devices, multi-function devices (MFDs), speakers, mobile devices, tablet devices, mobile phones, Smartphone, or other such devices. The remote computer can also include a personal computer (PC), server, router, network PC, RFID enabled device, a peer device or other common network node, or the like. The communication connection 120 may include a Local Area Network (LAN), a Wide Area Network (WAN), Bluetooth connection, or other networks. This functionality is described more fully in the description associated with FIG. 2 below.

Output 118 is most commonly provided as a computer monitor, but can include any output device. Output 118 and/or input 116 can include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 can function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device, such as input 116 which can be embodied, for example, as a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, can be stored on a computer-readable medium and can be executable by the processing unit 102 of computer 110. Program module or node 125 can include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention can be implemented. Network data-processing system 200 can be a network of computers or other such devices, such as mobile phones, smart phones, wearable computer such as computer-enabled goggles and glasses, sensors, controllers, speakers, tactile devices, and the like, in which embodiments of the present invention can be implemented. Note that the system data-processing system 200 can be implemented in the context of a software module, such as module 125. The data-processing system 200 includes a network 202 in communication with one or more clients 210, 212, and 214. Network 202 can also be in communication with one or more printing devices 204, servers 206, and storage 208. Network 202 is a medium that can be used to provide communications links between various devices and computers connected together within a networked data processing system such as computer system 100. Network 202 can include connections such as wired communication links, wireless communication links of various types, and fiber optic cables. Network 202 can communicate with one or more servers 206, one or more external devices such as multifunction device or printer 204, and storage 208, such as a memory storage unit, for example, a memory or database. It should be understood that printing device 204 may be embodied as a printer, copier, fax machine, scanner, multifunction device, rendering machine, photo-copying machine, or other such rendering device.

In the depicted example, printer 204, server 206, and clients 210, 212, and 214 connect to network 202 along with storage 208. Clients 210, 212, and 214 may be, for example, personal computers or network computers, handheld devices, mobile devices, tablet devices, smart phones, personal digital assistants, wearable computers including head-mounted displays such as goggles and glasses, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and printing device 204 are clients to server 206 in this example. Network data-processing system 200 can include additional servers, clients, and other devices not shown. Specifically, clients can connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 can also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which v be employed for directing the operation of the data-processing systems such as computer system 100 depicted in FIG. 1. Software application 305, can be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the computer system 100. The computer system 100 can receive user commands and data through interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein can refer to a collection of routines and data structures that perform a particular task or implements a particular abstract data type. Modules can be composed of two parts: an interface, which lists the constants, data types, variables, and routines that can be accessed by other modules or routines; and an implementation, which is typically private (accessible only to that module) and which includes source code that actually implements the routines in the module. The term module can also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" type system, such as Microsoft Windows®. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

The embodiments disclosed herein are drawn to methods and systems including a blended communication solution giving users the ability to provide insights not just about the environment or system, but also of the blended system in the context of the environment and vice-versa. With the power and flexibility of the interaction medium at hand, the goal of existing and future systems can ideally be to provide a seamless, "blended" environment, wherein users re not passive consumers of information, but can be active contributors whom can interact with the system, the real world, and more importantly, other users in the real world.

The virtuality continuum was introduced to scope out the space of interactions between reality and virtuality. While virtual reality typically refers to an isolated digital environment that is typically rendered through a device, augmented reality is more inclined towards projecting virtual objects in a real environment. While Virtual and Augmented reality has been around for quite some time, an emerging field called Immersive Analytics has been gaining traction, owing to the enhanced computing power that mobiles, tablets, and other interactive interfaces have incorporated. Immersive analytics is a new field that aims to explore how data and mixed reality can be integrated to provide an immersive experience for users. For instance, VisAR is a tool that enables users to interact with static visualizations using AR and investigate individual points on-the-fly. An alternate flavor of immersive analytics that integrates visual analytics with augmented reality is termed as "situational analytics". Situational analytics has purportedly led to faster performance of tasks in comparison to conventional physical interaction in the context of shopping. Drawbacks of AR and VR applications however lie in their inability to enable context. Blended reality enables users to interact with objects in both the real and virtual world in a manner that would be considered normal. This can be a foundational direction to build upon by addressing an evident gap in Mixed Reality applications—i.e., the ability to support communication and collaboration amongst other users in an immersive environment spread across the mixed reality spectrum.

While various technical definitions exist and address the spectrum of mixed reality, possible entities that can lead to interactive behaviors can comprise of physical and real object, virtual objects, virtual information about physical objects, and other users experiencing and sharing both the physical and virtual space. Literature has addressed various advantages of collaboration of mixed reality, most of which relate to the ability of annotating real and virtual objects. What's also helpful is the ability to gain real-time feedback from users in such environments. For instance, some systems use a mixture of device logs, environmental sensor data, contextual user experience sampling, and other application information to obtain both qualitative and quantitative feedback in the field. A varied interpretation of interaction has been demonstrated by a system that can allow users to interact with appliances in their homes to regulate energy consumption using smart meters. In the context of Augmented Reality, VisAR allows users to interact with augmented projections of static visualizations by filtering and highlighting. Perhaps most relevant to our conversation is WearCom, which allows users to provide virtual annotations in Mixed Reality that can be viewed by other users, promoting co-located collaboration. However, this work neither defines interaction methods nor does it comment on the design considerations needed to enable other users to process and provide feedback about these virtual annotations.

Evidently, it is not adequate to loosely translate collaboration to the mixed reality space. Careful considerations need to be made since this is neither an isolated virtual world, as is the case with the works discussed above, nor the real world, where all interactions can be captured through gestures, voice modulation, and other behavioral cues. The blended environment poses many challenges, and it is essential to be thorough when attempting to enable collaboration. The disclosed embodiments herein take into account these aspects and proposes systems, methods and apparatuses that are generalizable across use cases and are all-encompassing of possible information seeking and sharing practices. There are many weaknesses in current practices around the integration of data and the real world. Described herein are solutions that can overcome these shortcomings. The present embodiments enable enhancement of blended reality—an immersive user experience—that enables users to understand and interact with real objects.

In a real-time setting, information seeking and analysis is a multi-step process, often involving more interaction mediums than necessary. One views an object and is either successful in identifying the object, or unsuccessful, leading to a search process initiated through information seeking either in-person with visual exploration of object, engaging another individual in a conversation, or discovery based on internet-powered search. This is often a tedious multi-step process, requiring a lot of investment in terms of time, cognition, and resources. Furthermore, it requires a user's constant attention and relies on their memory to retrieve this information. Blended Reality aims to enable users to blur the differences between the real and virtual worlds, enabling them to interact with both environments within a single setting.

There are shortcomings in current technological solutions that need to be tackled in order to optimize workflows. These shortcomings can be prioritized into three crucial factors that have influenced the design of the present features of the embodiments:

Data-Driven Decision Making—Most systems require the user to switch between multiple contexts and gather information from various sources. Hence, it is important to enable users to make decisions by having an assimilated single source from which they obtain not just data but also insights from this data.

Faster Contextualization and Comprehension—In addition to providing insights, it is also important to ensure that users have sufficient context to understand these insights. Most systems take a one-solution-fits-all approach towards this problem and provide a static interaction for all users. The present embodiments overcome this drawback by providing context-driven information that is displayed through visualizations on the blended interface. This helps in faster information comprehension while learning from historical user interaction with the real environment allows the personalization and contextualization of this information.

Multi-Channel Interaction—The third most important quality that is lacking in blended reality is the lack of medium that allows interactions amongst users within an environment. Most systems isolate users, leading to increased delays in communication and prioritization of tasks. Our system overcomes this drawback by capturing user feedback instantaneously and allowing users to share a common context about the environment through contextual conversations.

The embodiments integrate the concept of a knowledge ecosystem with blended reality, and thereby we propose the concept of a blended knowledge ecosystem, or in short, a blended ecosystem—an ecosystem that utilizes blended reality to enable immersive interactions between the user, system, and the real environment. This ecosystem has been mindfully designed in a manner that facilitates contextualization of information being viewed as well as prioritization of follow-up actions that can be taken. It also provides seamless communication amongst users, enabling shareable insights and prompt decision-making from dynamically assimilated knowledge.

An embodiment of the invention includes mapping physical objects to appropriate information is an integral part of the above process. This can be attained only if the objects can be instantaneously recognized in the real world by the blended interface. Computer vision modules can help us achieve this instantaneous recognition and mapping to corresponding information retrieval pipeline. This can contain 2 distinct forms of recognition—recognizing an object in the real world, and recognizing components within the object to get granular information about the same.

Figure 4:
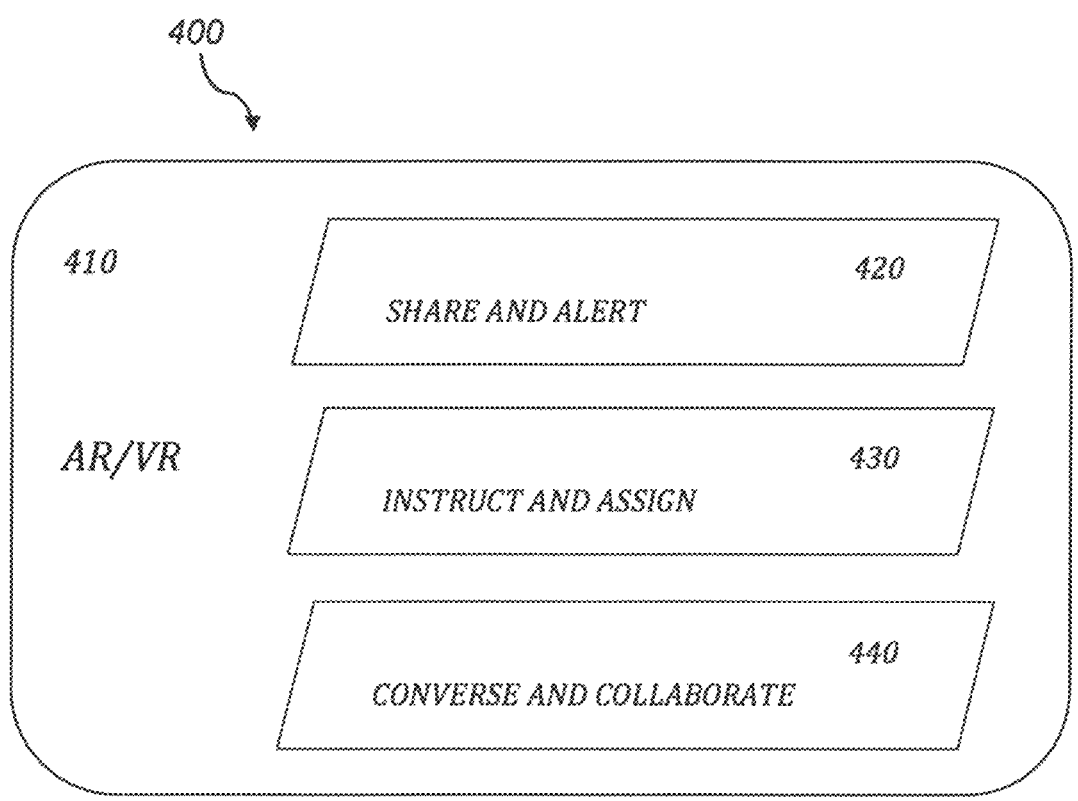
FIG. 4 depicts a system that includes blended communication engine, in accordance with a aspect of the embodiments.

Referring to the block diagram 400 in FIG. 4, an embodiment of a system of the invention includes blended communication engine 410. Most AR/VR applications are geared towards providing users a certain experience but often miss out on understanding how users perceive, interpret and communicate these experiences. Although the importance of user collaboration is a given necessity in most HCI related studies, it has not been an area of focus in most applications. The blended communication engine 410 helps bridge this gap amongst users in the blended ecosystem by allowing a multi-channel platform for shared, real-time interaction amongst its users, system, and environment. This engine can provide three different forms of interaction between the user and the ecosystem: an embodiment of the invention that includes a share and alert module 420—providing the ability to alert another user or group by sharing an information block, an embodiment of the invention that includes an instruct and assign module 430—providing the ability to highlight segments of interest within an information block and direct the corresponding instructions to specific people, and an embodiment of the invention that includes a converse and collaborate module 440—providing involved members with an ability to have contextual discussions about shared information blocks and instructions.

This system has a key advantage that neither the real environment nor the system can capture in isolation the power of context. Conventional mixed reality applications are designed to provide a rather scoped unidirectional flow of information, disabling the user to the cadre of a mere consumer of information. This system, however, allows multi-way communication, making users information producers as well. Users do not only receive information from the system and environment, but can also have conversations about both real and blended objects in the system. Incorporating user feedback and providing real-time insights on the fly on a blended interface is an advantage of the presently described system.

Given the present embodiments, users are enabled to interact with each other within an immersive environment, thereby supporting an integrated environment for creating, sharing, and conversing about the knowledge created by different users. This is unique, as most existing solutions focus has been on providing users with an immersive experience where they can isolate themselves, while embodiments of the present invention direct efforts towards enabling collaboration in such experiences, breaking conventional goals of isolating the user, and providing context at each step in their interaction.

An interactive design method to enable multi-way communication and collaboration between the users of blended reality environment. Users can interact with each other by annotating and building upon previous annotations in their shared environment. Share and alert 420 provides the ability to alert another user or group by sharing an information block. Instruct and assign 430 provides the ability to highlight segments of interest within an information block and direct instructions to specific people. Converse and Collaborate 440 allows groups to have a contextual discussion about shared information.

The disclosed system is more immersive than traditional augmented reality in that it allows users to interact with each other via annotations on real objects in the environment. Benefits of this system include efficient information tagging of real-world objects, and communication between personnel managing the objects. Such efficient information tagging and communication can reduce the cost and time of, for example, facility maintenance. While present systems can pull information about objects from a social network database or information database for users to annotate, annotations about objects using the present system and methods can also come directly from users interacting with each other about an object in its environment. It is unique to provide multi-party interactions in mixed reality solutions through the provision of collaboration and communication and an ability to assign tasks to users in a blended environment, support of color-differentiated highlighting within information blocks, tagging of users and groups to/with the highlighted blocks, and ultimately supporting multi-threaded conversations and comments on the shared information blocks.

A featured embodiment of the present invention is the ability for users to capture and share information about both real and blended objects. Here, real objects are defined as objects present in the physical environment, while blended objects refer to those present in the knowledge ecosystem that capture and demonstrate uniquely identifiable information about real objects. The overarching goal of Share and Alert 420 is to enable users to share their context easily with other users in the ecosystem, so that one may see another's perspective. In order to support Share and Alert 410 in blended environments, the method illustrated in FIG. 5 can be followed.

Figure 5:
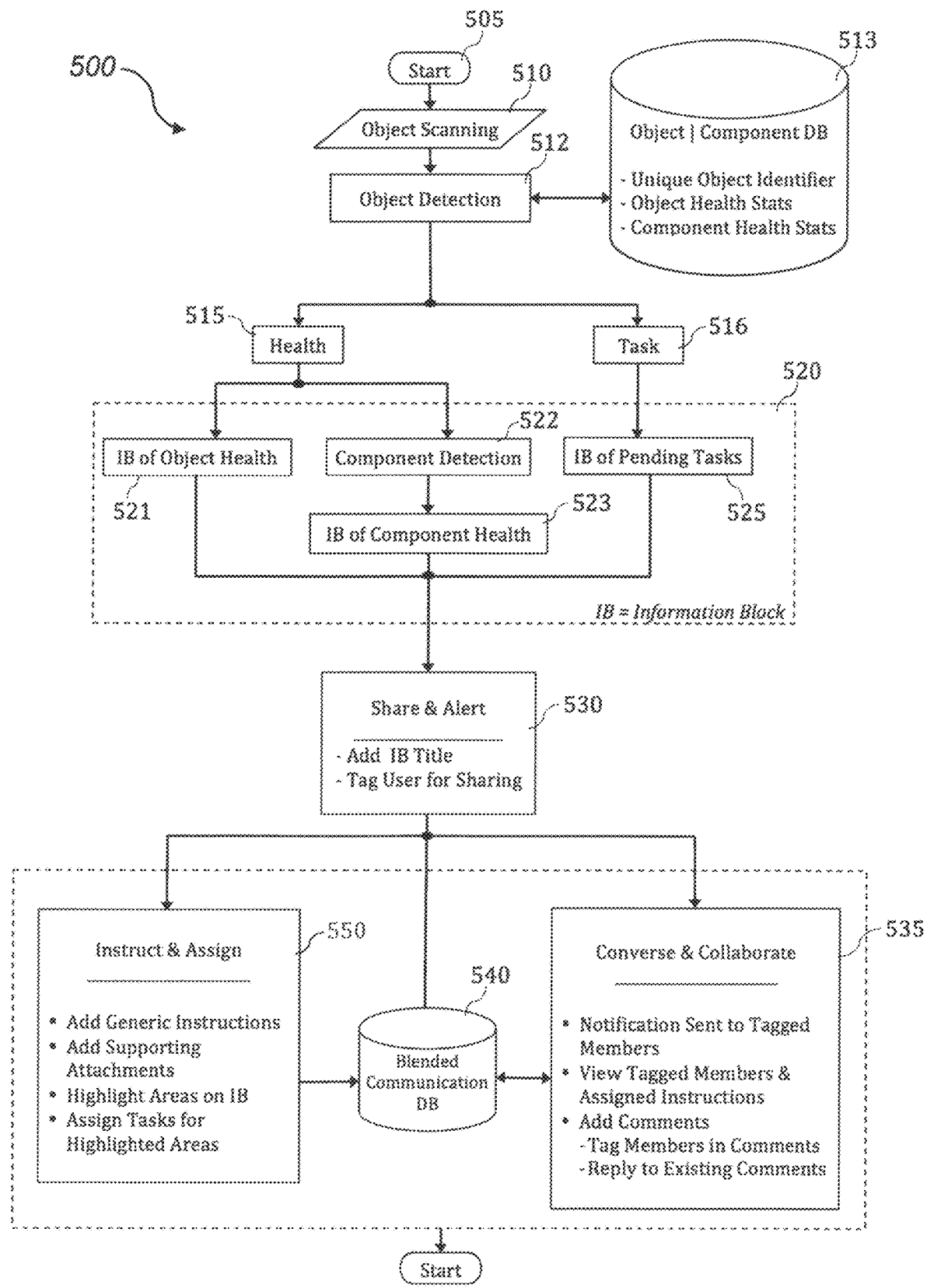
FIG. 5 depicts a block diagram of a blended system architecture and flowchart depicting interactive process flow for a system and method, in accordance with aspects of the embodiments.
Figure 6:
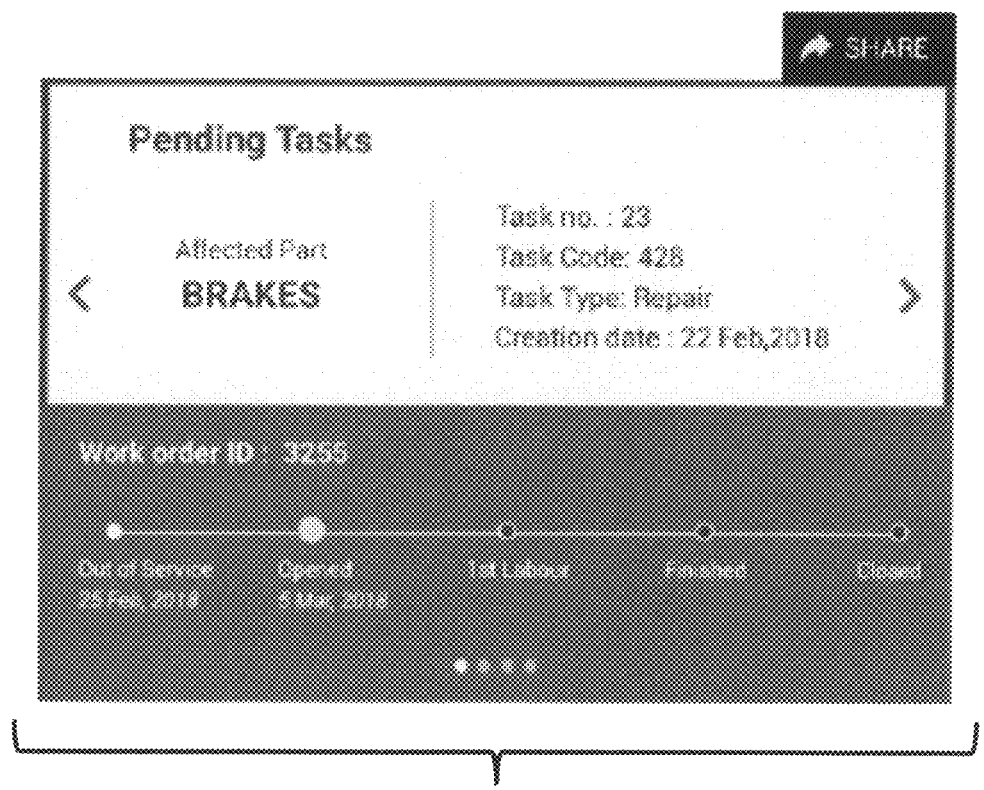
FIG. 6 depicts an image provided as an example of an information block that can enable a share button to capture blended context, in accordance with an example for aspects of the embodiments.

FIG. 5 illustrates a blended system architecture and flowchart 500 depicting interactive process flow for a system, in accordance with a feature of the embodiments. The process begins as Block 505. Referring to block 510, a user can scan an object of interest. The object of interest can then be identified as shown in Block 512. The user can decide to retrieve granular information related to individual components within the object of interest by selecting or scanning the component. As shown in block 512, contextual information about this object or component can be retrieved from various databases 513. Data about the object and/or individual components, including granular and contextual information can flow that includes categories of health 515 and tasks 516. Data can be used/compiled in a manner showcasing historical, current, and predictive insights, if any, as information blocks 520 where compiled data that can be displayed on a screen to users. Information blocks 520 can organize and include data regarding object health 521, components detected 522 and component health 523, and the identification of any pending tasks 525. Referring to an image provided as an example in FIG. 6, each information block can enable a share button 527 that captures this blended context. A share and alert module is shown in Block 530. Here, a user can choose to share the example information block similar to the example image depicted in FIG. 6, which can also allow the user to add a title to the information block and identify (i.e., tag) users and groups with which to share their context with. The context, along with any supplemental images of the component or object, can be latched on to the component and its parent object, with access control support. User interactions can be managed by the converse and collaborate module 535 where relevant data can be captured and then stored in a repository 540 (i.e., blended communication database) for the user to view at a later point of time without necessarily being physically present in front of the object. Then, as shown in block 535, the user can also view other users' interactions with the object, provided they have the authority to do so, either through the supervisory nature of their role, or through the establishment of communication between these users about the object and its blended context.

Figure 7A:
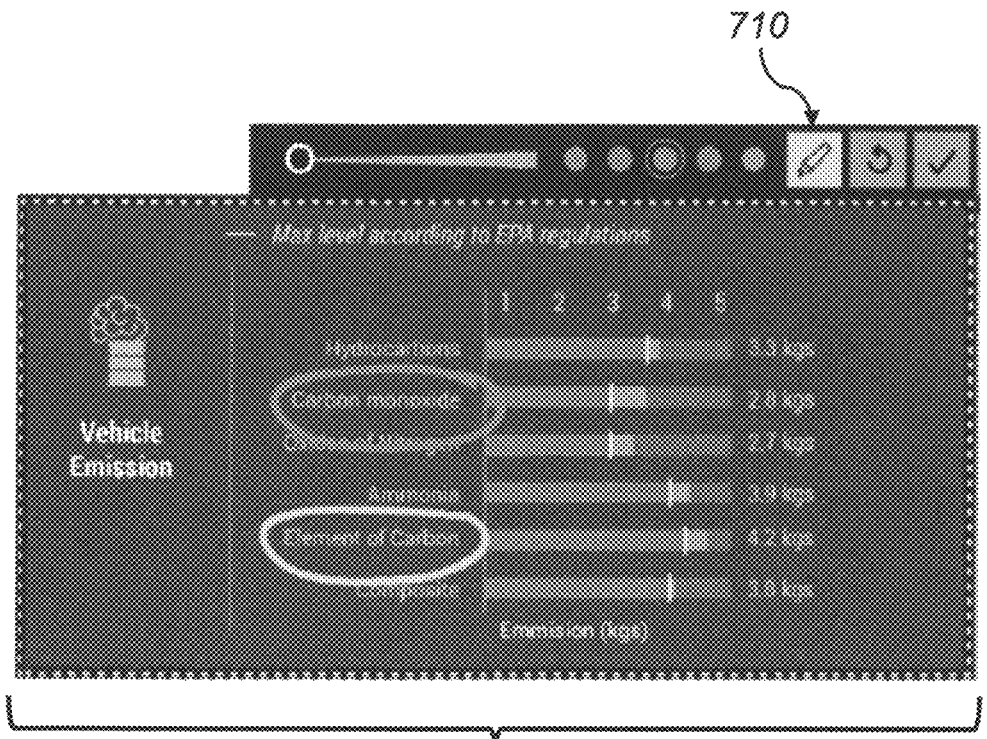
FIGS. 7A-B depicts images of an interaction method to support Instruct and Assign functions, according to aspects of the embodiments.
Figure 7B:
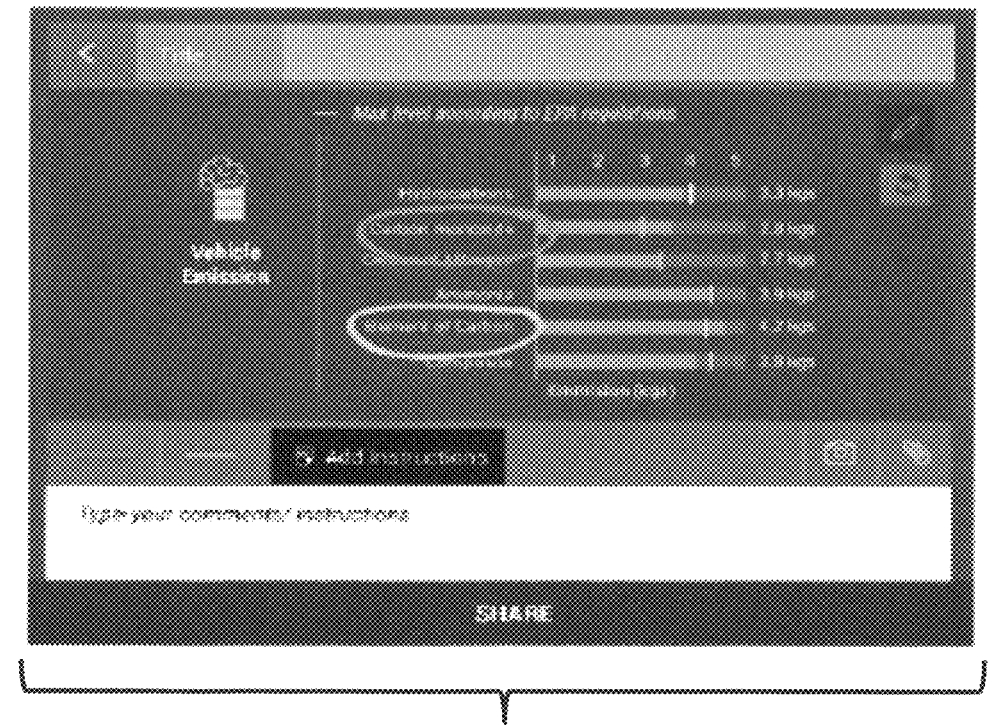

In addition to the sharing and alert, and converse and collaborate context of the system, there is a need to support visual information seeking practices in a blended environment. The Instruct and Assign module 550 provides the user with an ability to drill down into granular details and provide detailed information about problems, complaints, faults, and recommendation. It further supports the ability to assign tasks to multiple users within this environment, while providing specific context to individuals who are collaborating to address a larger concern. Instructions can be predominantly textual in nature; however, an advantage of the system is to enable users to draw immediate attention to certain areas or objects that could need inspection or careful examination. This can be achieved by highlighting and encircling an area, or selecting an object of interest, and can be personalized further by tagging other users that can comprehend the context of the alert. In order to support this, user can be allowed to color-code their highlights on blended information, and assign users and groups based on these color-codes. The interaction method to support Instruct and Assign is illustrated in the photographed depicted in FIGS. 7A-B. As shown in the image in FIG. 7A-B, a user can identify an information block that they want to share. As shown in FIG. 7B, the user can describe the title and general instructions he wants to share over this block (the example being "Vehicle Emission"). A user can further add supporting blocks in the form of annotated audios, videos, and images to the selected information block that is to be shared. As shown in FIG. 7A, the user can highlight and differentiate elements within this information block (e.g., encircling text using different colors). An ability to support color-based differentiations can be provided by the marker tool 710 within the interface. The user can then proceed to assign role-based instructions, either collectively, or by tagging specific users and teams to color-codes corresponding to their respective highlighted segments within the annotated information blocks, as shown in FIG. 7B. Then, users and groups that have been tagged can receive alerts in their applications, where they can then view the information blocks with their assigned instructions instantly.

Figure 8:
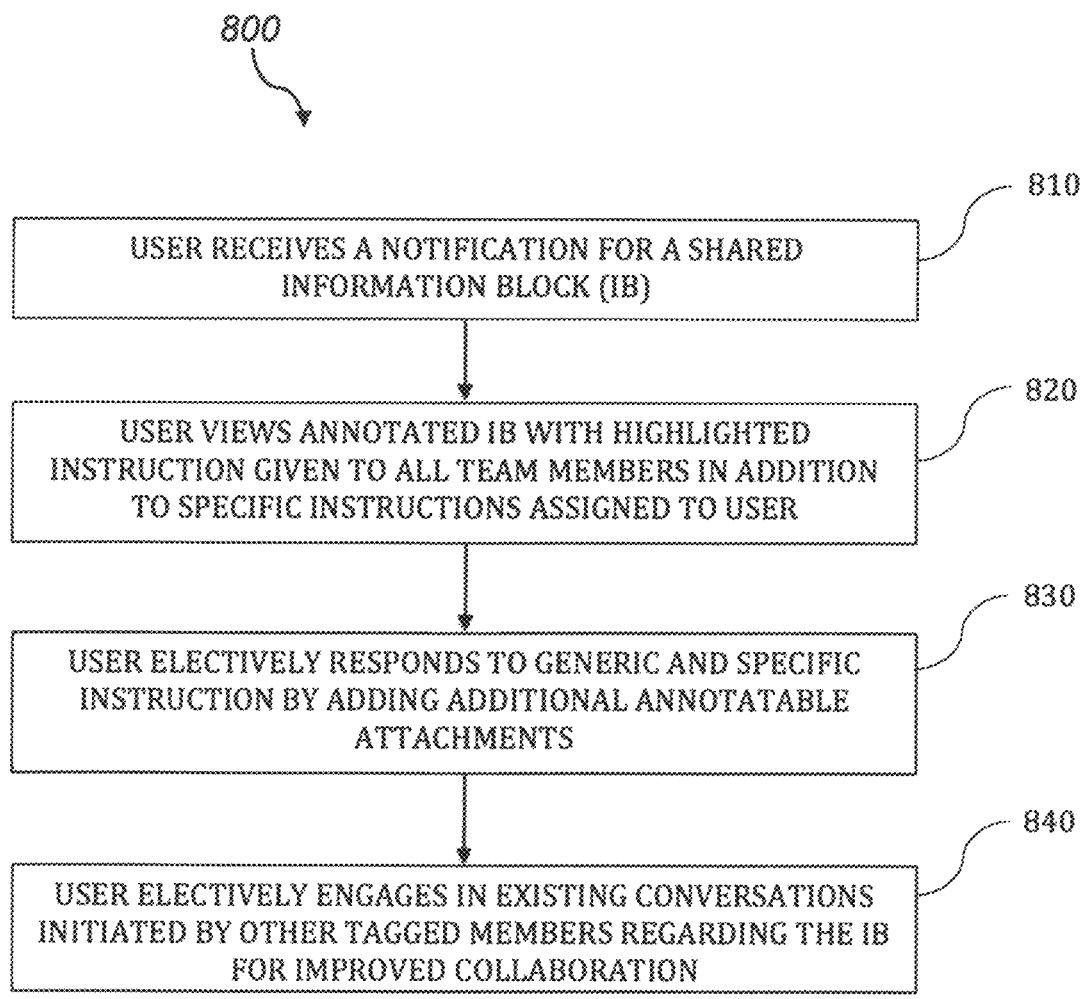
FIG. 8 depicts a flow diagram of an interaction method for a Converse function in accordance with an aspect of the embodiments.
Figure 9:
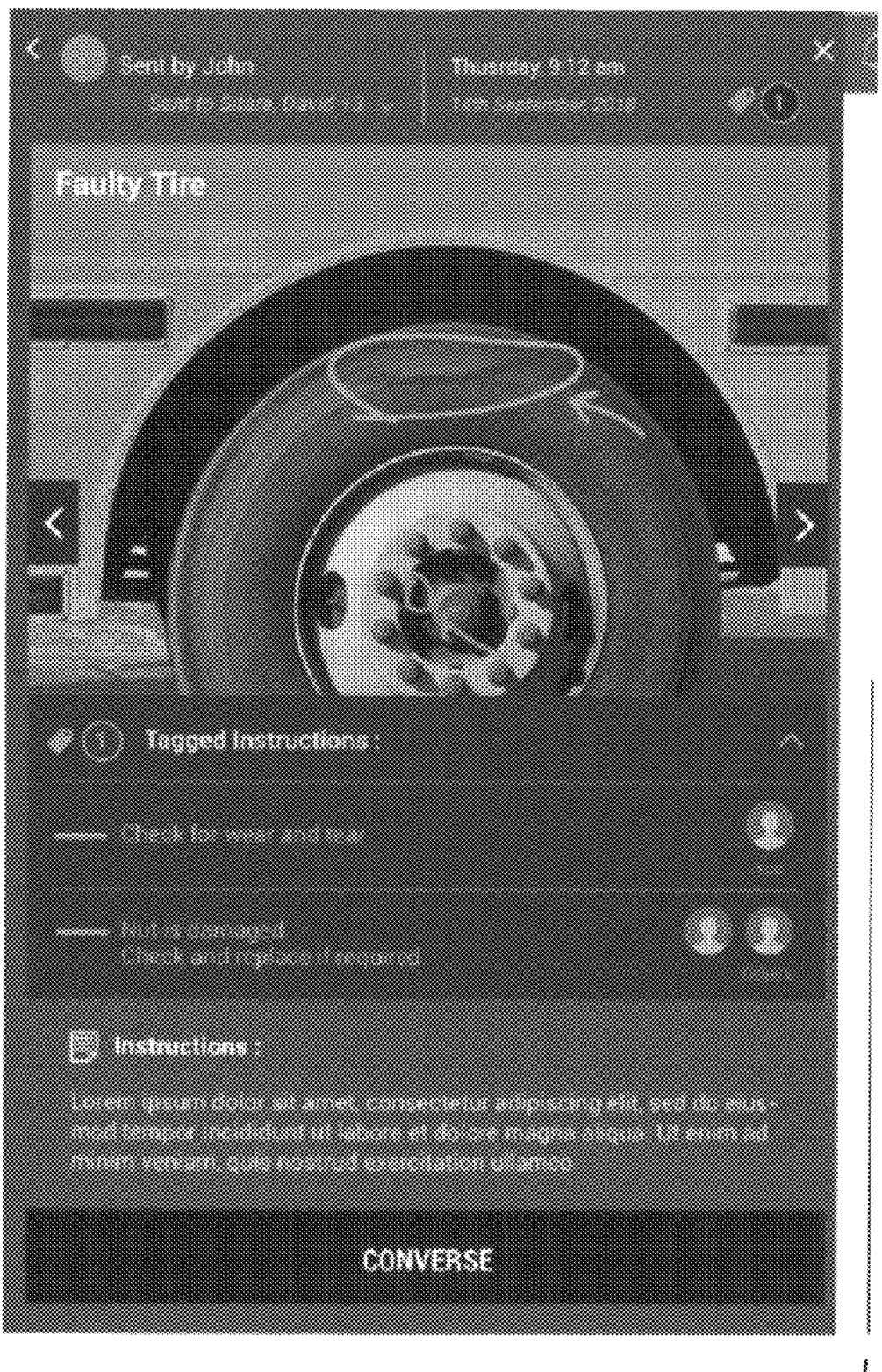
FIG. 9 depicts an image of an interface where a user can view the annotated information block which has the highlighted instructions given to team members in addition to specific instructions assigned to the user, in accordance with an example interface for use with the embodiments.
Figure 10:
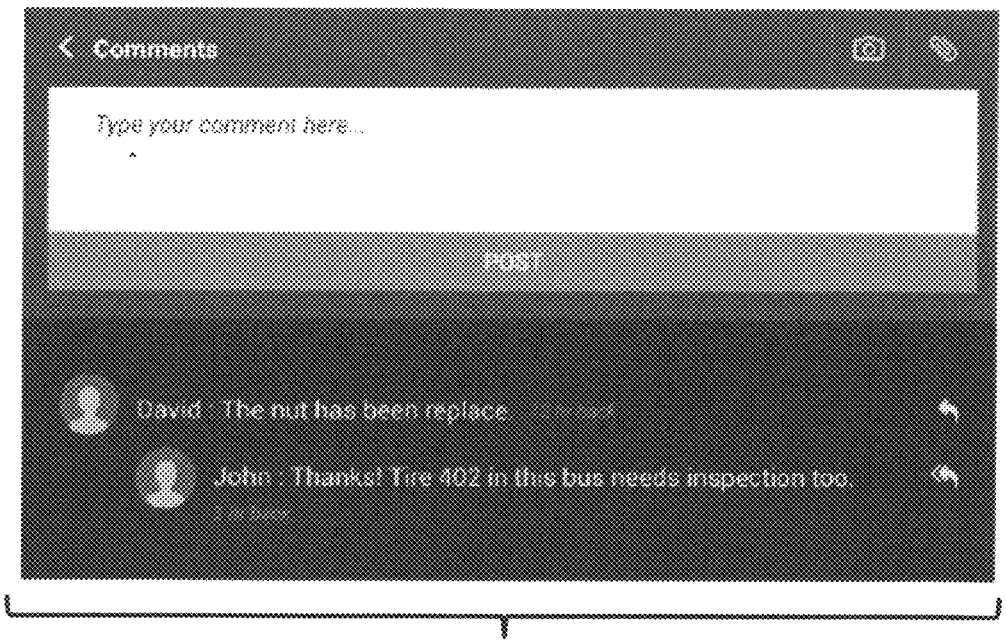
FIG. 10 depicts an image of an interface where a user can elect to engage in existing conversations initiated by other tagged members regarding an information block for improved collaboration that can be provided in the form of threaded comments on instructions, in accordance with an example interface for use with the embodiments.

While information sharing is generally a one-way process through instruction and by providing alert, it is a unique feature of the embodiments to support multi-party interactions in a blended communications environment. Enabled by the Converse and Collaborate module 535, users can be provided an ability to engage in discourse about blended elements with other tagged members and teams. This can allow users to brainstorm on problems and come up with solutions collectively. Converse and Collaborate can be enabled for example through the interaction method illustrated by the flow diagram in FIG. 8. Referring to block 810, a user can receive a notification for the shared information block. As shown in block 520, upon accessing this notification, the user can view the annotated information block which has the highlighted instructions given to all team members in addition to specific instructions assigned to him. An example of this is illustrated by the image depicted in FIG. 9. As shown in block 530, the user can elect to respond to these generic and specific instructions by adding additional attachments that can be annotated to illustrate his response further. Then, as shown in block 540, the user can further elect to engage in existing conversations initiated by other tagged members regarding the information block for improved collaboration. This can be provided in the form of threaded comments on instructions as depicted in the photograph in FIG. 10.

Use Case—Vehicle Health Monitoring

In the conventional vehicle maintenance workflow, various teams, managers, and sometimes, verticals, concurrently engage in diverse information seeking and creation practices. For instance, if a driver encounters a problem with the vehicle, he calls the controller who then identifies the vehicle and sends an email to the designated garage supervisor. Concurrently, the driver coordinates with a service writer to create a work order (either digital or handwritten), which is then shared with the garage supervisor. The garage supervisor reviews all work orders, identifies the availability of personnel, and then distributes the work among the technicians and specialists. The corresponding technician obtains a copy of the work order, identifies and performs tasks. The technician then notifies the garage supervisor about completed tasks and pending tasks that need examination. This process is often cyclical and involves additional cognitive overload on numerous individuals in assimilating information from verbal, paper, and digital records. Also, many of these processes occur sequentially as opposed to occurring simultaneously, thereby consuming much more time than required.

By translating the blended ecosystem to the context of vehicle maintenance activities, this process can be better addressed and optimized by reducing cognitive overload on the maintenance personnel, enabling seamless communication among individuals and departments, and also minimizing the time taken to act upon the insights received. In this context, the real environment could be any physical setup for activities like inspection, repair, maintenance, and documentation of the records, while the virtual environment could relate to the generation, capture, storage, and retrieval of data for further analysis and representation through interactive visualizations. To show how such interactions can occur in a blended ecosystem, the different kinds of information that need to be communicated should first be described.

Figure 11:
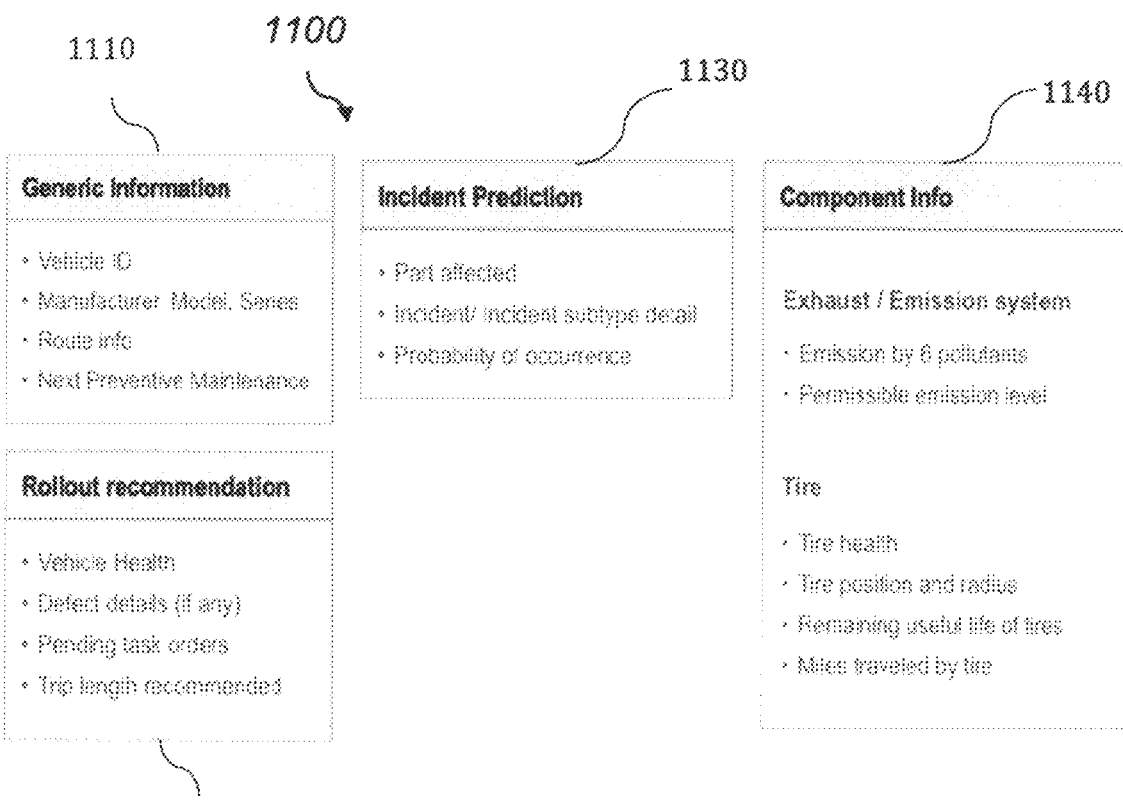
FIG. 11 depicts a block diagram of an information bucket design for a vehicle maintenance scenario, in accordance with an example use of the embodiments.

Referring to FIG. 11, a block diagram 1100 illustrates an information bucket design for a vehicle maintenance scenario is depicted. Generic information 1110 can include a vehicle ID, manufacturer, model and service, Rout information, and next preventative maintenance. Rollout recommendations 1120 can include vehicle health, defect details, pending task orders and trip length recommendations. Incident predictions 1130 can include parts affected, incident subtype detail, and a probability of occurrence. Component information 1140 can include exhaust/emission system data, and tire data (e.g., tire health, tire position and radius, remaining useful life of tires, and the miles traveled by tires).

Figure 12A:
FIGS. 12A-T depicts images of a user interface wherein a vehicle maintenance process that can be engaged in by users of a system, in accordance with aspects of the embodiments.
Figure 12B:
Figure 12C:
Figure 12D:
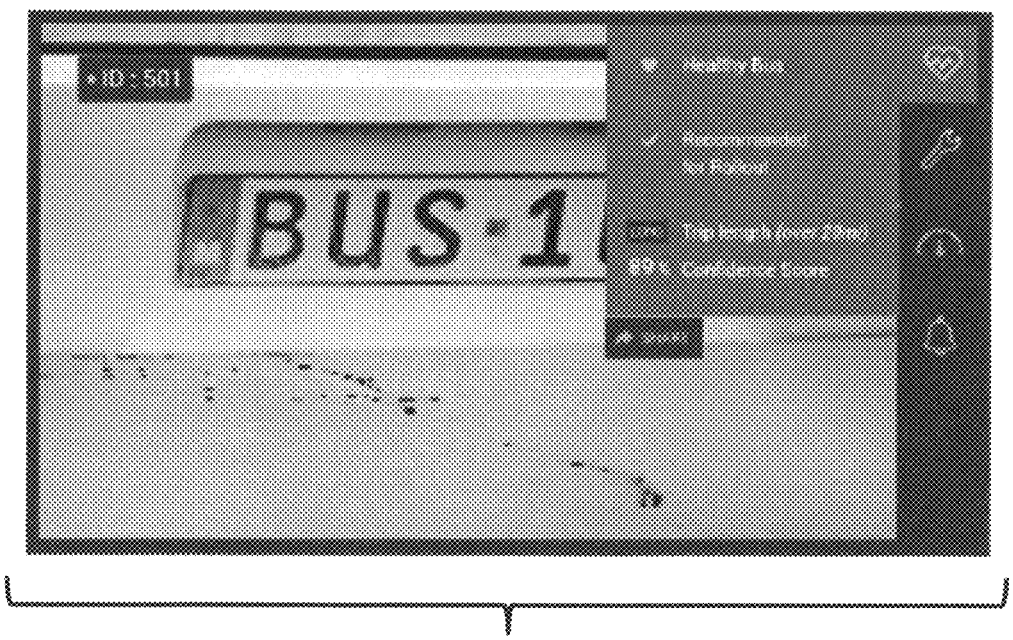
Figure 12E:
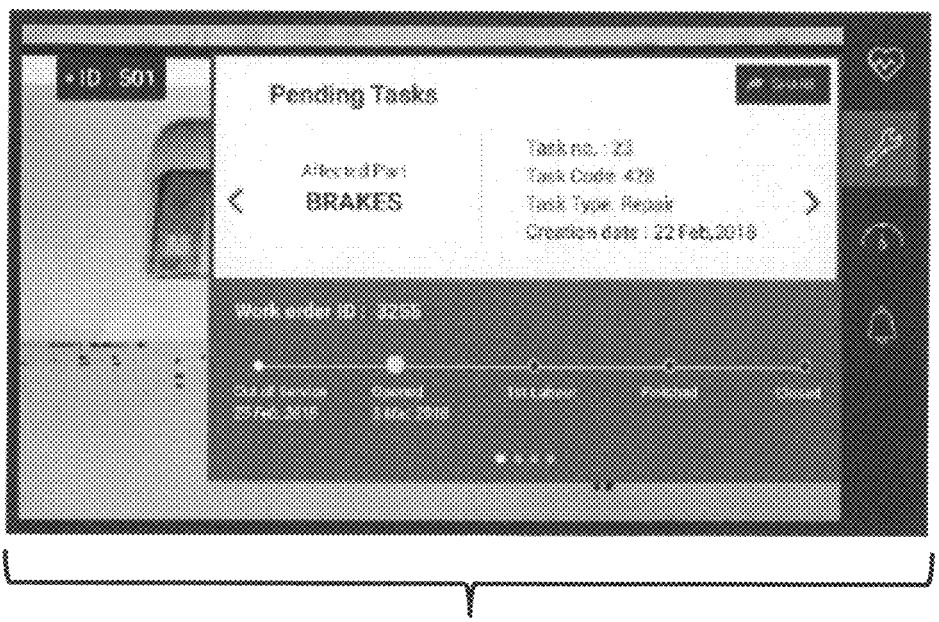
Figure 12F:
Figure 12G:
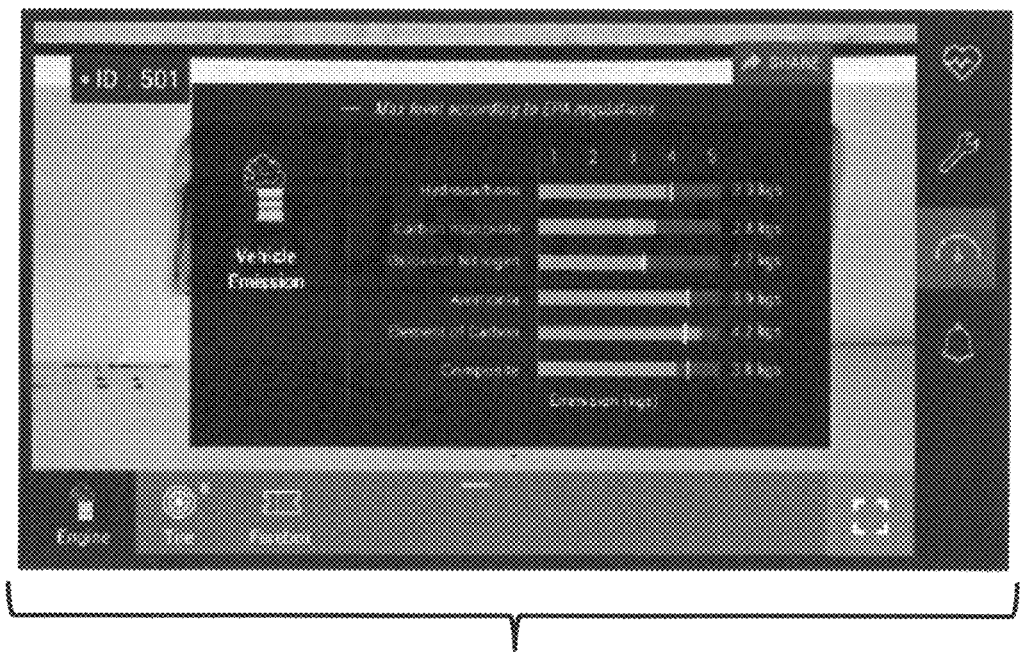
Figure 12H:
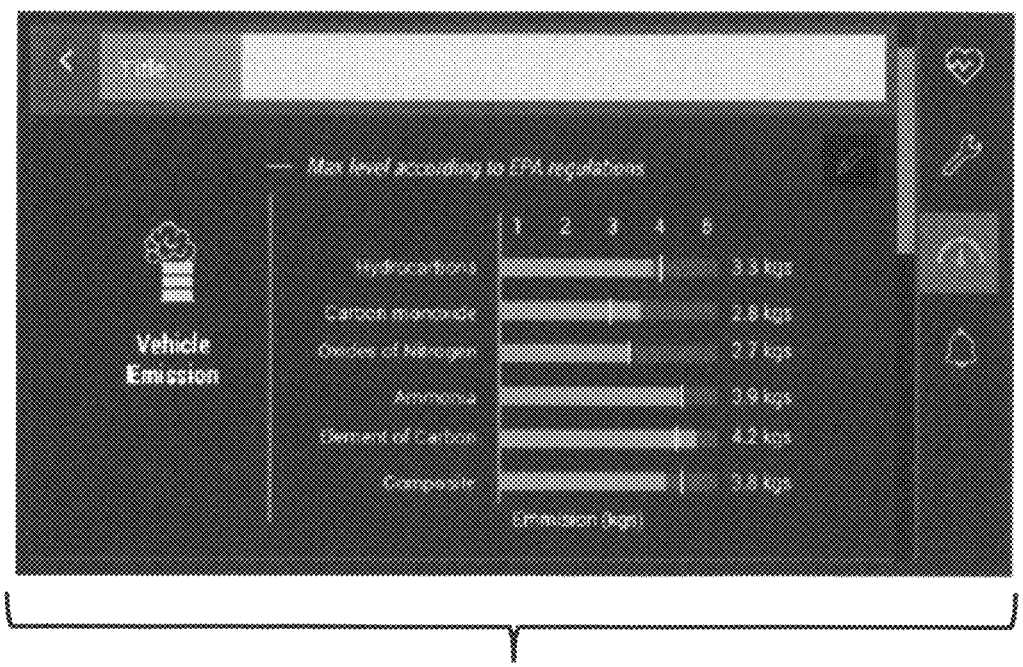
Figure 12:
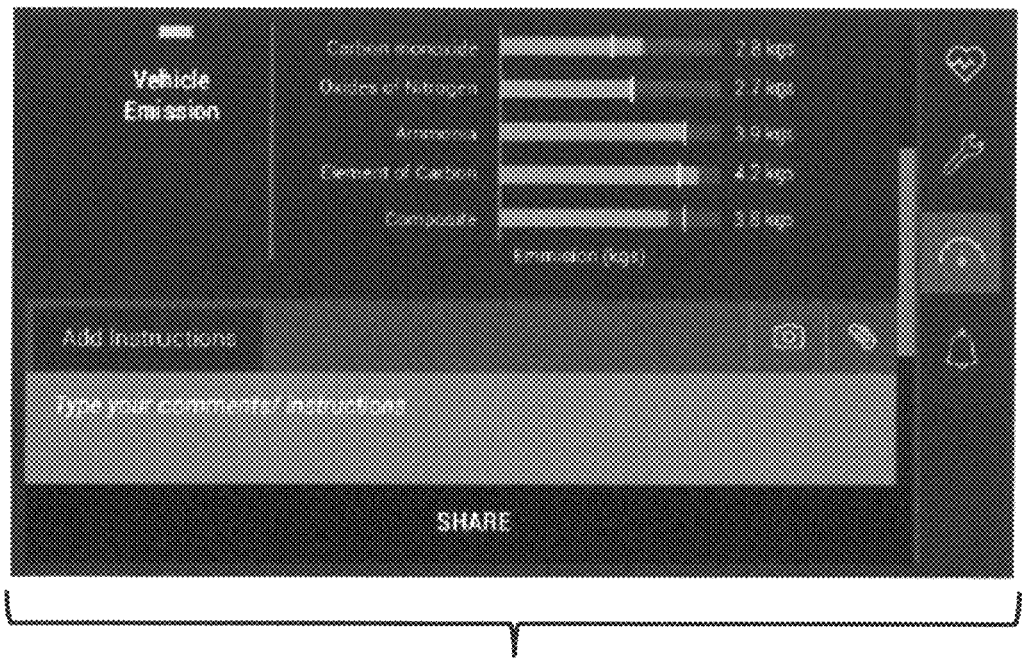
Figure 12J:
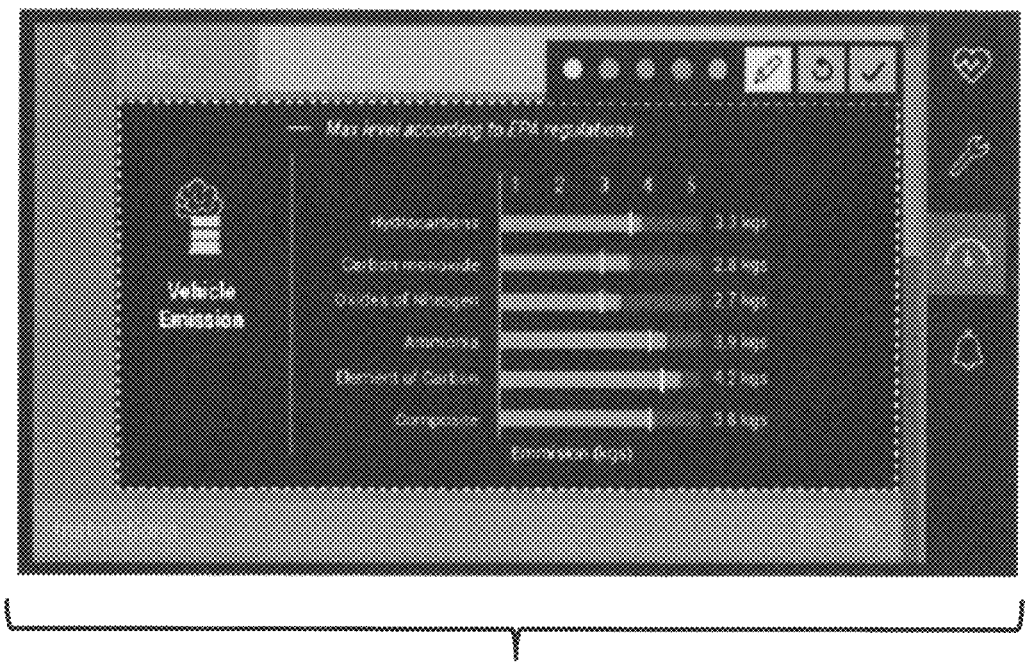
Figure 12K:
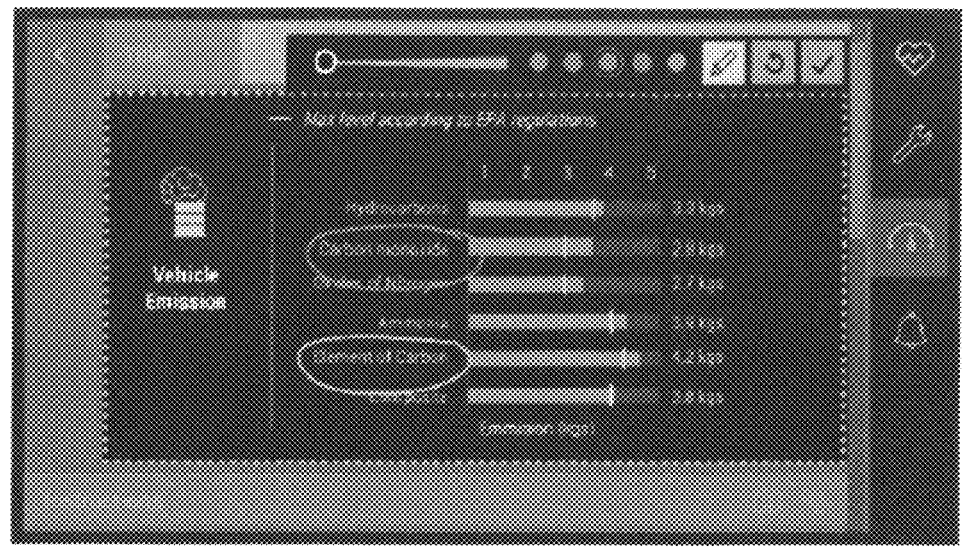
Figure 12L:
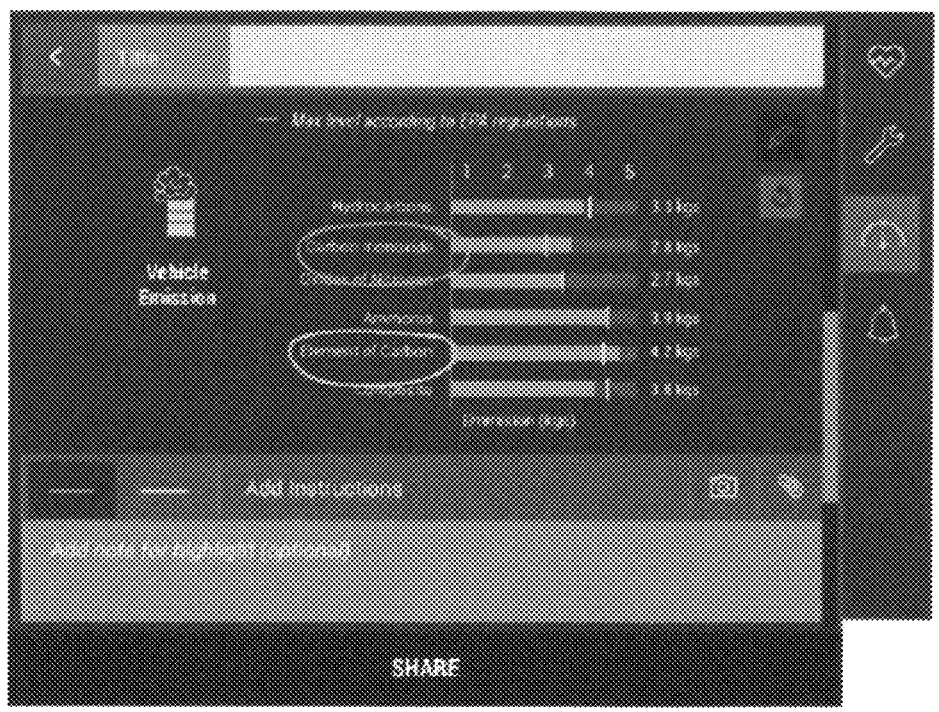
Figure 12M:
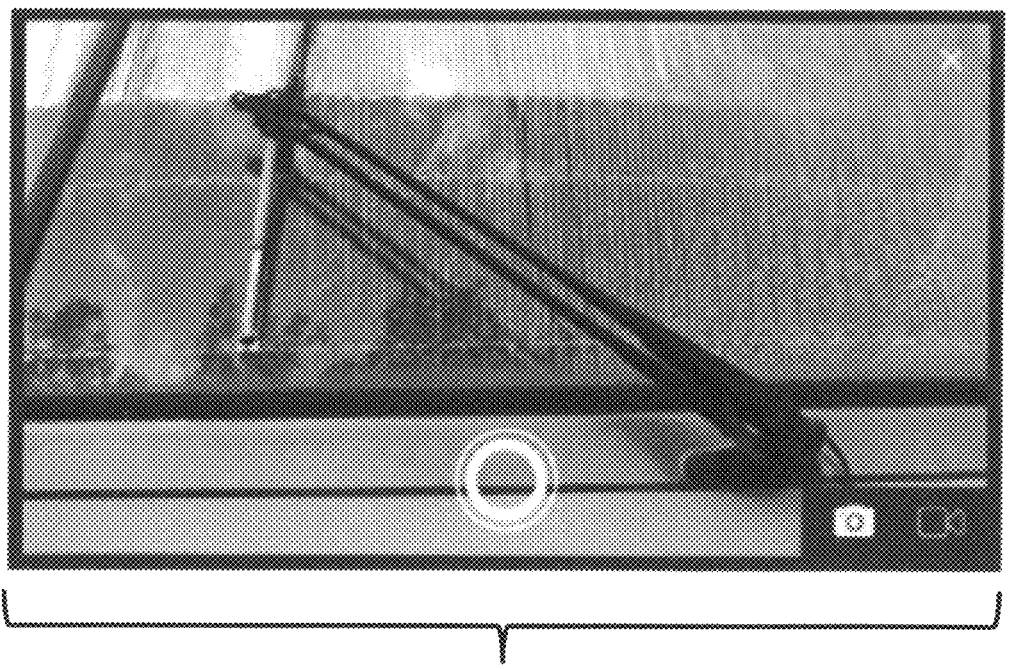
Figure 12N:
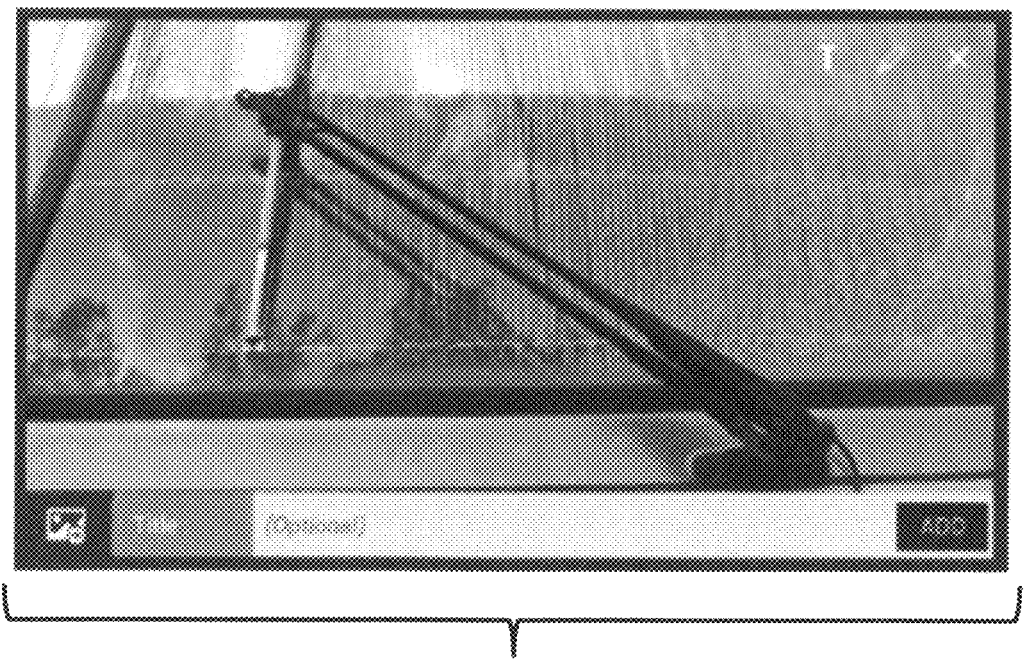
Figure 12:
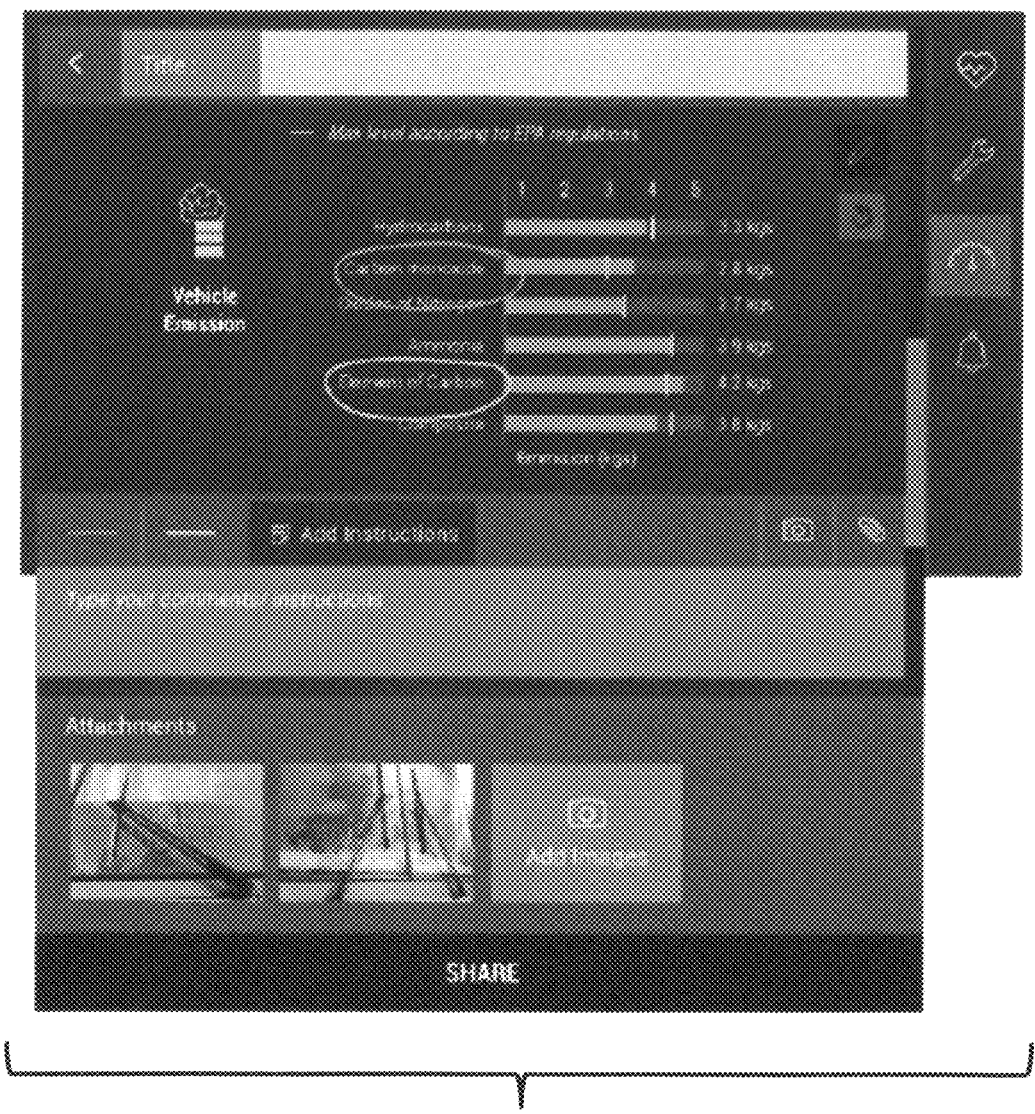
Figure 12P:
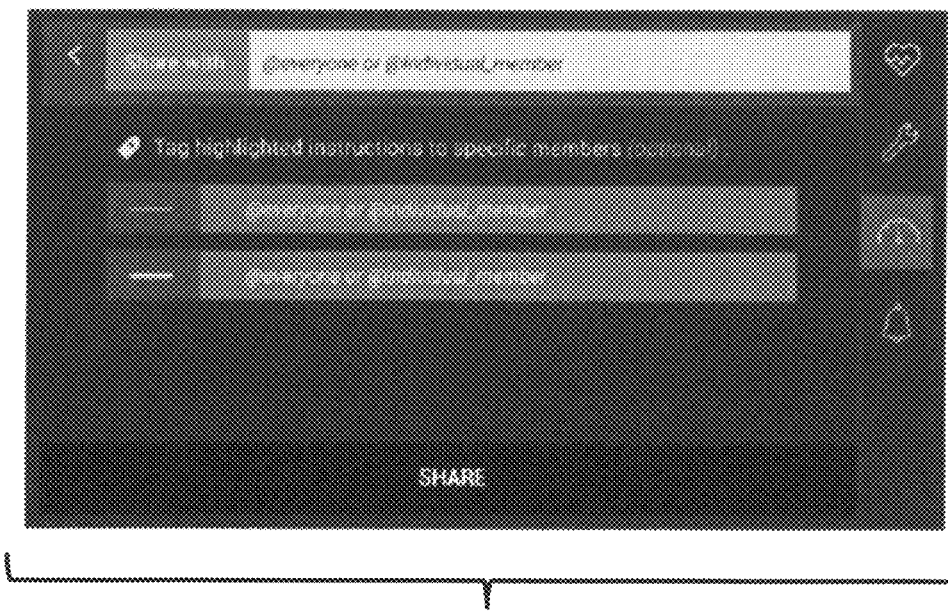
Figure 12Q:
Figure 12R:
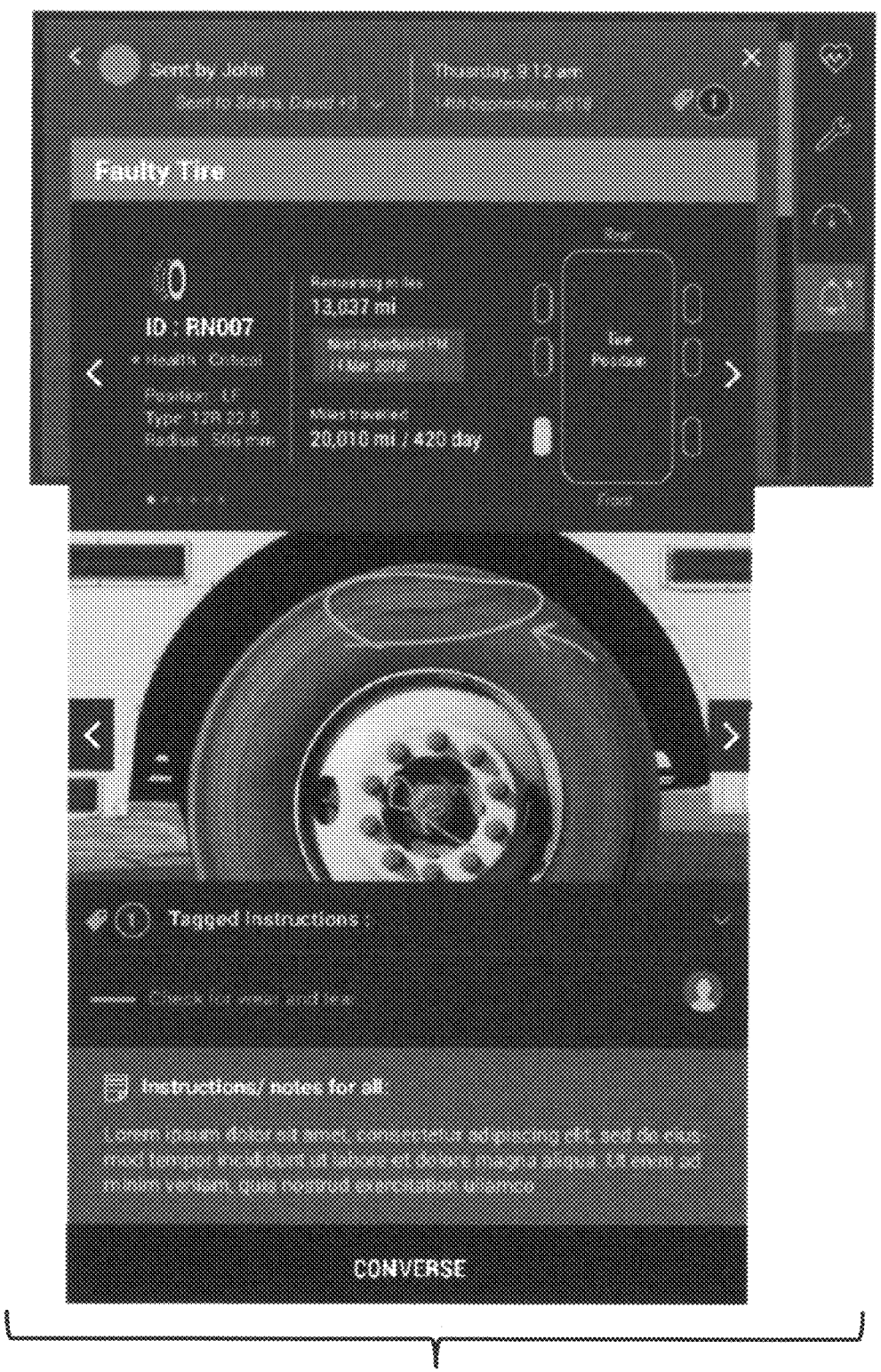
Figure 12S:
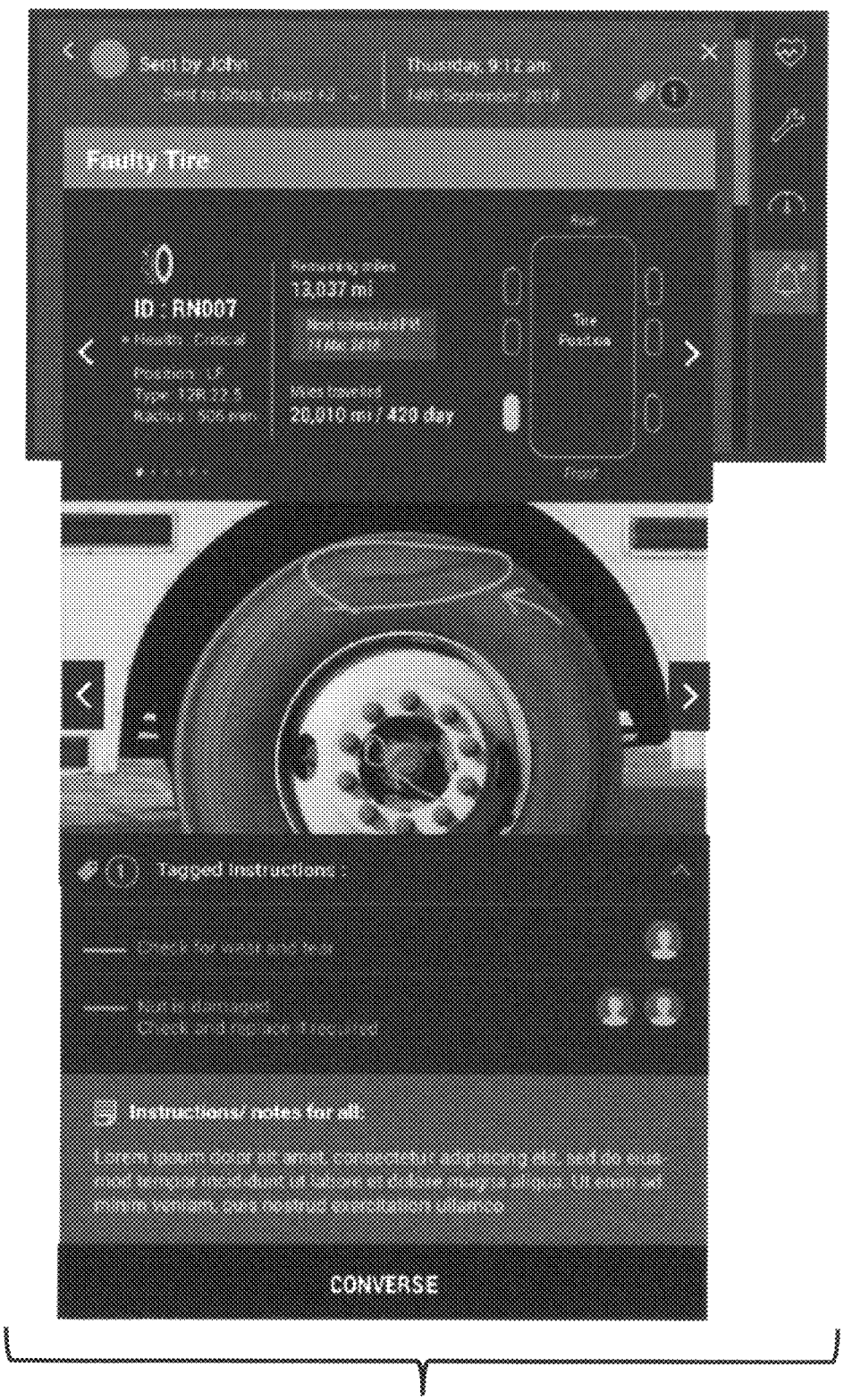
Figure 12T:
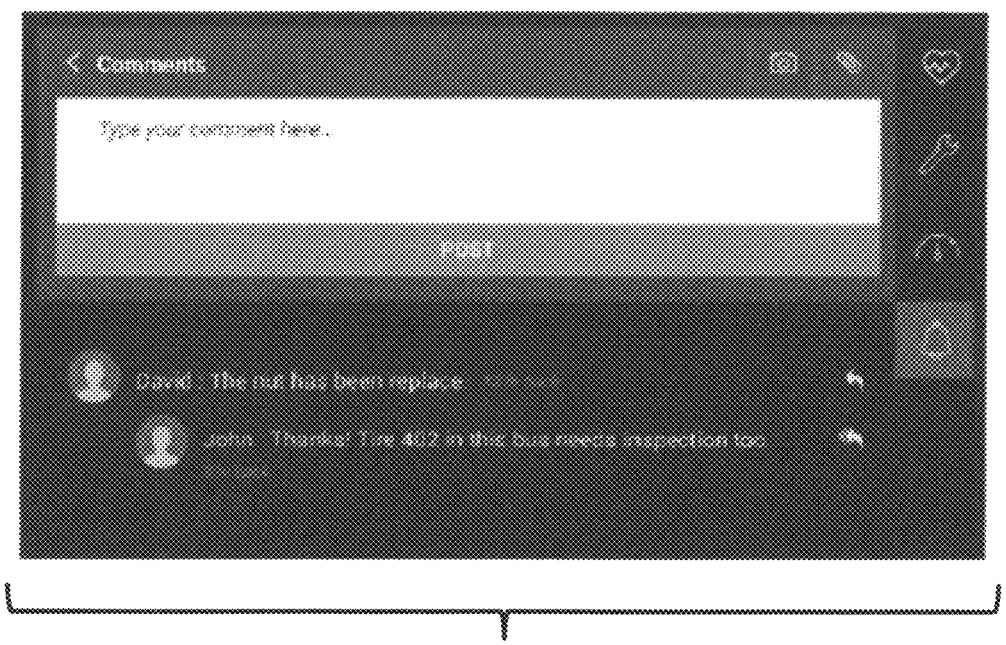

Referring to FIGS. 12A through 12T, how communication and collaboration through the blended ecosystem can occur will be demonstrated given an automotive scenario. The scenario if an example only and is not meant to limit the scope of the present embodiments.

Scenario: John is a garage inspector of an organization that operates a fleet of buses in a city. His routine includes visually inspecting each bus. On finding any damages or defects in the bus, he must determine the most appropriate solution for rectification in consultation with specific garage inspectors to supervise repairs.

John can detect the vehicle by a simple scan of a license plate. Here, an advanced Optical Character Recognition (OCR) model, trained on a vast array of license plates, can be incorporated, which automatically captures a scene to first identify the plate number of the vehicle, as demonstrated in FIG. 12A (scanning a license plate), or the license plate can be manually entered of license plate as show in FIG. 12B. Once the vehicle is successfully identified as shown in FIG. 12C, John can then retrieve information about that vehicle in real-time, such as the health and current status of the vehicle as depicted in FIG. 12D and pending maintenance tasks as shown in FIG. 12E. Sometimes, defects and aberrations might not pertain to the entire vehicle, but rather to smaller parts (or components) within a vehicle. In such cases, retrieving component-level insights on the fly can be achieved in 2 ways. Once the vehicle is detected by its license plate (FIG. 12C), information about all its associated components can be fetched and viewed interactively through the Parts section in the system as depicted in FIG. 12F. This provides a list of components that can be delved into further by the user. After the vehicle is detected, components can also be individually scanned using the Scan feature in the parts menu. The information related to the identified component can automatically be retrieved. In cases where additional clarification of position is required (i.e., tires, headlights, wipers), information related to the component in the position selected on the screen of the user interface can be retrieved.

Each information block has a share button that leads to the ability for users to add additional context. Continuing with the scenario, as John is inspecting the vehicle and retrieving information, he sees abnormalities in the Vehicle Emission information as depicted in FIG. 12G. He can choose to share this information block and add a title as shown in FIG. 12H, and add general instructions as shown in FIG. 12I. He can also choose to edit the information block with annotations as shown in FIG. 12J, and by highlighting Carbon Monoxide and Element of Carbon values as shown in FIG. 12K. John can choose to add different instructions based on each of the values that can be highlighted using different colors, as illustrated in FIG. 12L. John can also add additional attachments that can be annotated, which is illustrated in FIGS. 12M-N with wiper blades as the example part shown in the photograph. Once this is accomplished, John can share this annotated information block with other users as shown in FIG. 12O. In addition, John can tag specific users to highlighted instructions as shown in FIG. 12P. Once information blocks are shared with a user, say a technician named Bob, the user receives notifications that lead him to these annotated information blocks, such as depicted in FIG. 12Q. Here, Bob is able to see that John has shared this card with him, Sitara, David, and 2 others as illustrated in the photograph in FIG. 12Q. In addition, there is a specific instruction that has been assigned to Bob. A highlight on the image is referenced to Bob, asking him to check for wear and tear, in addition to general instructions given to him and other tagged members as illustrated in FIG. 12R. As shown in FIG. 12S, users can communicate with each other regarding the objects, components, associated instructions and other data in a blended environment using threaded conversation.

Bob also notices a nut missing from the tire and wants to bring this to attention. On choosing to converse as shown in FIG. 12T, he can see that David has already addressed the missing nut and John has asked for inspection of another tire on the same bus. Bob can leave a new comment about his questions for the rest of the team, or can tag specific users in his comments as well, thus finding a solution collaboratively without needing to interact in-person and be present on-site at the same time.

Accordingly, it s a feature of the herein described embodiments that a blended communication engine can bridge a gap that currently exits amongst users in the blended ecosystem by allowing a multi-channel platform for shared, real-time interaction amongst the users, system, and environment. A blended communication engine can provide three different modules supporting useful forms of interaction between the users of a blended reality ecosystem: Share and Alert—giving users the ability to alert another user or group by sharing an information block; Instruct and Assign—giving user the ability to highlight segments of interest within an information block and direct the corresponding instructions to specific people; Converse and Collaborate—given the involved members' ability to have contextual discussions about shared information blocks and instructions. Users interact with each other in virtual reality and augmented reality platforms over communication links using annotations on real objects in an environment thereby enabling efficient information tagging of real-world objects, and communication between personnel managing the objects.

Such efficient information tagging and communication can reduce the cost and time of, for example, facility maintenance. The concerns include the prior art involving virtual reality and augmented reality with communication links between participating users. However, while the prior art pulls information from a social network database or information database to annotate people or objects, the annotations about objects in this invention come from the users interacting with each other in the environment Based on the foregoing, it can be appreciated that a number of embodiments, preferred and alternative, are disclosed herein. For example, in one embodiment, a blended communication engine can be provided that includes a share and alert module enabling a user to alert another user or group by sharing blended information blocks, a instruct and assign module enabling the user to highlight segments of interest within the information block and direct corresponding instructions to specific users, and a converse and collaborate module enabling select users engaged as members in collaboration with an ability to have contextual discussions about shared information blocks and instructions.

For example, in one embodiment, the blended communication engine bridges a gap amongst users in the blended ecosystem by allowing a multi-channel platform for shared, real-time interaction amongst the users, system, and environment.

In another embodiment, blended information blocks are highlightable and differentiable through colored annotations.

In another embodiment, colored annotations can be assigned to different users and groups to direct their attention to specific instructions about highlighted elements within the information block.

In another embodiment, a converse and collaborate module can be further configured to enable the users to engage in threaded conversations about the shared information blocks that they are assigned to.

In another embodiment, a user can interact with the group of users by scanning an object of interest, identifying the object of interest, and mapping the object of interest to a unique object identifier, rendering an information block related to the object for a user selection of at least one of the object health, the component health, and the pending tasks, tagging concerned user that should receive the sharable content from the information block and sharing the sharable content with the concerned users.

In another embodiment, a user can interact with the group of users by scanning an object of interest, identifying the object of interest, and mapping the object of interest to a unique object identifier, retrieving object and component specific information associated with the unique object identifier from a database, rendering an information block related to the object for a user selection of at least one of the object health, the component health, and the pending tasks, tagging concerned user that should receive the sharable content from the information block, and sharing the sharable content with the concerned users.

In another embodiment, a user can interact with the group of users by scanning an object of interest, identifying the object of interest, and mapping the object of interest to a unique object identifier, rendering an information block related to the object for a user selection of at least one of object health, component health, and pending tasks, including a title corresponding with the information block for sharable content, tagging concerned user that should receive the sharable content from the information block, and sharing the sharable content with the concerned users.

In another embodiment, a user can interact with a group of users by scanning an object of interest, identifying the object of interest, and mapping the object of interest to a unique object identifier, retrieving object and component specific information associated with the unique object identifier from a database, selectively exploring object health, component health, and pending tasks associated with the object, rendering an information block related to the object for a user selection of at least one of the object health, the component health, and the pending tasks, including a title corresponding with the information block for sharable content, tagging concerned user that should receive the sharable content from the information block, and sharing the sharable content with the concerned users.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art, which are also intended to be encompassed by the following claims.

The invention claimed is:

1. A blended communication engine, comprising:
a share and alert module comprising an interface and implementation that is accessible by the share and alert module, wherein the share and alert module is operable to enable a user to alert another user or a group by sharing blended information blocks, wherein the blended information blocks are sharable with other users to provide additional context about objects and individual components within objects in an environment through the share and alert module;
a instruct and assign module comprising an interface and implementation that is accessible by the instruct and assign module, wherein the instruct and assign module is operable to enable the user to highlight segments of interest within the information block and direct corresponding instructions to specific users, and wherein the instruct and assign module allows the user to drilldown into granular details and provide detailed information regarding problems, complaints, faults, and recommendations; and
a converse and collaborate module comprising an interface and implementation that is accessible by the converse and collaborate module, wherein the converse and collaborate module is operable to enable select users engaged as members in collaboration with an ability to have contextual discussions about shared information blocks and instructions;
wherein the communication engine bridges a gap amongst users in a blended ecosystem by allowing a multi-channel platform for shared, real-time interaction amongst the users, system, and the environment.

2. The blended communication engine of claim 1, further comprising multi-directional communication between the select members users making users information producers as well.

3. The blended communication engine of claim 1, wherein the instruct and assign module is further operable to enable the users to provide detailed instructions about specific areas of interest and assign the detailed instructions to different users and teams through role-based access, both individually and collectively.

4. The blended communication engine of claim 3, wherein areas of interest on information contained within blended information blocks are highlightable and differentiatable through colored annotations.

5. The blended communication engine of claim 4, wherein colored annotations are assignable to different users and groups to direct their attention to specific instructions about highlighted elements within an information block among the blended information blocks.

6. The blended communication engine of claim 1, wherein the converse and collaborate module is further operable to enable the users to engage in threaded conversations about the shared information blocks that they are assigned to.

7. A blended reality communication engine supporting multi-party communication over virtual reality and augmented reality platforms, comprising:
 a share and alert module comprising an interface and implementation that is accessible by the share and alert module, wherein the share and alert module is operable to enable users to alert other users or groups of users with information about an object contained in an information block sharable with other users to provide additional context about objects and individual components within objects in a blended reality environment through the share and alert module;
 an instruct and assign module comprising an interface and implementation that is accessible by the instruct and assign module, wherein the instruct and assign module is operable to enable the users to highlight segments of interest within the information block and direct the corresponding instructions to the other user or the groups of users, wherein the instruct and assign module allows the other user or the groups of users to drilldown into granular details and provide detailed information regarding problems, complaints, faults, and recommendations; and
 a converse and collaborate module comprising an interface and implementation that is accessible by the converse and collaborate module, wherein the converse and collaborate module is operable to enable the users, the other user and the group of user status as members of a group associated with the object with an ability to have contextual discussions about shared information blocks and instructions.

8. The blended reality communication engine of claim 7, wherein the users, the others users and the groups of users interact with each other in a virtual reality platform and an augmented reality platform over data communication links using annotations on real objects in the blended reality environment thereby enabling efficient information tagging of real-world objects, and communication between personnel managing the real-world objects.

9. The blended reality communication engine of claim 7, wherein a user interacts with the group of users by:
 scanning an object of interest, identifying the object of interest, and mapping the object of interest to a unique object identifier;
 rendering an information block related to the object for a user selection of at least one of the object health, the component health, and the pending tasks;
 tagging concerned user that should receive the sharable content from the information block; and
 sharing the sharable content with the concerned users.

10. The blended reality communication engine of claim 7, wherein a user interacts with the group of users by:
 scanning an object of interest, identifying the object of interest, and mapping the object of interest to a unique object identifier;
 retrieving object and component specific information associated with the unique object identifier from a database;
 rendering an information block related to the object for a user selection of at least one of the object health, the component health, and the pending tasks;
 tagging concerned user that should receive the sharable content from the information block; and
 sharing the sharable content with the concerned users.

11. The blended reality communication engine of claim 7, wherein a user interacts with the group of users by:
 scanning an object of interest, identifying the object of interest, and mapping the object of interest to a unique object identifier;
 rendering an information block related to the object for a user selection of at least one of object health, component health, and pending tasks;
 including a title corresponding with the information block for sharable content;
 tagging concerned user that should receive the sharable content from the information block; and
 sharing the sharable content with the concerned users.

12. The blended reality communication engine of claim 7, wherein a user interacts with the group of users by:
 scanning an object of interest, identifying the object of interest, and mapping the object of interest to a unique object identifier;
 retrieving object and component specific information associated with the unique object identifier from a database;
 selectively exploring object health, component health, and pending tasks associated with the object;
 rendering an information block related to the object for a user selection of at least one of the object health, the component health, and the pending tasks;
 including a title corresponding with the information block for sharable content;
 tagging concerned user that should receive the sharable content from the information block; and
 sharing the sharable content with the concerned users.

13. A method of managing and communicating data about an object in a blended reality environment, comprising:
 scanning an object of interest, identifying the object of interest, and mapping the object of interest to a unique object identifier;
 retrieving object and component specific information associated with the unique object identifier from a database;
 selectively exploring object health, component health, and pending tasks associated with the object;
 rendering an information block related to the object for a user selection of at least one of the object health, the component health, and the pending tasks, wherein the information block comprises a graphically displayed share button that is selectable by the user to add additional context, and wherein the information block further comprises at least one information block among a plurality of blended information blocks, wherein the at least one information block is sharable with other users to provide additional context regarding objects and individual components within objects in the blended reality environment;
 including a title corresponding with the information block for sharable content;
 tagging a concerned user that should receive the sharable content from the information block; and
 sharing the sharable content with the concerned users.

14. The method of claim 13, further comprising:
 adding generic instructions and descriptions to the sharable content; and including supporting attachments including at least one of live visuals, images or video with the generic instructions; and highlighting areas of interest on the shareable content including highlights on the supporting attachments.

15. The method of claim 14, wherein each set of interests can be represented with a different color.

16. The method of claim 14, wherein specific tasks are directed to individuals based on the color codes related to highlighted areas.

17. The method of claim 14, wherein all interactions, shared information, and instructions are stored in the blended communication database for further retrieval.

18. The method of claim 14, wherein all tagged members receives notifications about alerts and assignments.

19. The method of claim 14, wherein all associated members are able to view other tagged members and their assigned instructions.

20. The method of claim 14, wherein each member can converse with other tagged members by: creating comments, tagging members in comments, and replying to existing comments.

* * * * *